(12) United States Patent
Nagata

(10) Patent No.: US 7,787,042 B2
(45) Date of Patent: Aug. 31, 2010

(54) IMAGE DISPLAY DEVICE FOR DISPLAYING A CALENDAR CORRESPONDING TO A SENSED IMAGE

(75) Inventor: Hiroshi Nagata, Tokyo (JP)

(73) Assignee: Olympus Corporation, Tokyo (JP)

( * ) Notice: Subject to any disclaimer, the term of this patent is extended or adjusted under 35 U.S.C. 154(b) by 800 days.

(21) Appl. No.: 11/235,297

(22) Filed: Sep. 26, 2005

(65) Prior Publication Data

US 2006/0114346 A1 Jun. 1, 2006

(30) Foreign Application Priority Data

Oct. 5, 2004 (JP) ............................. 2004-293086

(51) Int. Cl.
*H04N 5/222* (2006.01)
(52) U.S. Cl. ................................. 348/333.11
(58) Field of Classification Search ............... None
See application file for complete search history.

(56) References Cited

U.S. PATENT DOCUMENTS

| | | | | |
|---|---|---|---|---|
| 6,741,278 | B1 * | 5/2004 | Toyofuku et al. | 348/222.1 |
| 6,950,989 | B2 * | 9/2005 | Rosenzweig et al. | 715/721 |
| 6,996,782 | B2 * | 2/2006 | Parker et al. | 715/764 |
| 7,325,198 | B2 * | 1/2008 | Adcock et al. | 715/722 |
| 7,398,479 | B2 * | 7/2008 | Hooper et al. | 715/838 |
| 2002/0140820 | A1 * | 10/2002 | Borden, IV | 348/207.99 |
| 2003/0033296 | A1 * | 2/2003 | Rothmuller et al. | 707/3 |
| 2003/0156138 | A1 * | 8/2003 | Vronay et al. | 345/772 |
| 2004/0078389 | A1 * | 4/2004 | Hamilton | 707/104.1 |
| 2004/0145602 | A1 * | 7/2004 | Sun et al. | 345/720 |
| 2004/0169742 | A1 * | 9/2004 | Shibutani et al. | 348/231.5 |

FOREIGN PATENT DOCUMENTS

| | | |
|---|---|---|
| JP | 6-110639 | 4/1994 |
| JP | 11-215457 | 8/1999 |
| JP | 2001-169239 | 6/2001 |
| JP | 2004-94890 | 3/2004 |
| JP | 2004-260710 | 9/2004 |

OTHER PUBLICATIONS

Office Action mailed on Feb. 23, 2010 from co-pending Japanese Patent Application No. 2004-293086.
Office Action mailed Jun. 8, 2010 from co-pending Japanese Patent Appln. No. 2004-293086.

* cited by examiner

*Primary Examiner*—Justin P Misleh
(74) *Attorney, Agent, or Firm*—Volpe and Koenig, P.C.

(57) ABSTRACT

A sensed image and shooting time information corresponding to the sensed image are stored on a memory card. A display unit comprises a plurality of display areas at specific consecutive shooting times and displays the shooting time in the display area. A CPU specifies a display area in which a sensed image corresponding to the shooting time as an image-existing area, and enables the display unit to visibly indicate the image-existing area of the display areas specified as the image-existing area, based on a prescribed condition by a cursor. In this case, when the movement of the display area is instructed, the CPU moves only the image-existing area and indicates the existence of an image, by controlling the movement of the cursor.

8 Claims, 14 Drawing Sheets

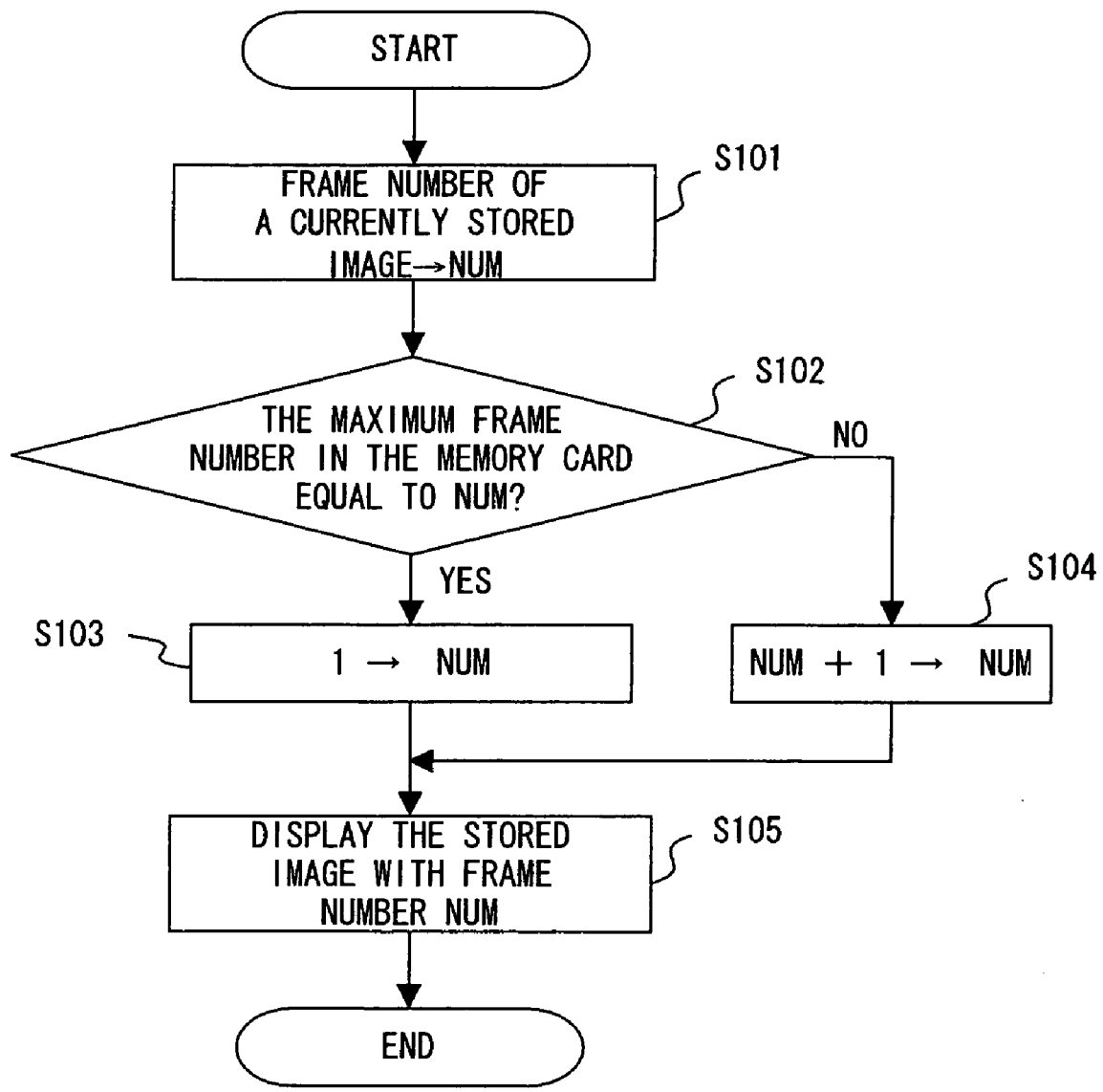
F I G. 5

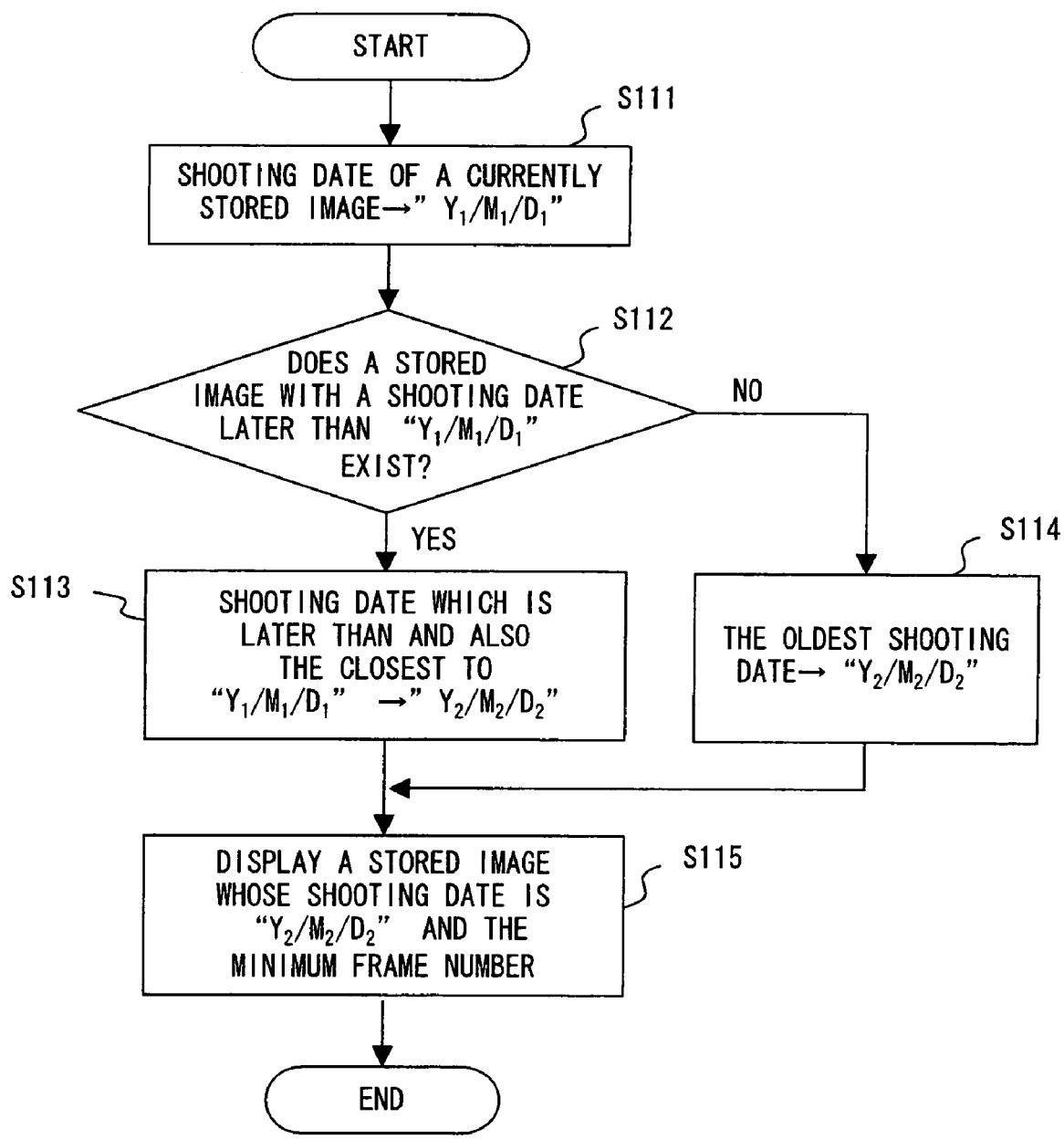
F I G. 6

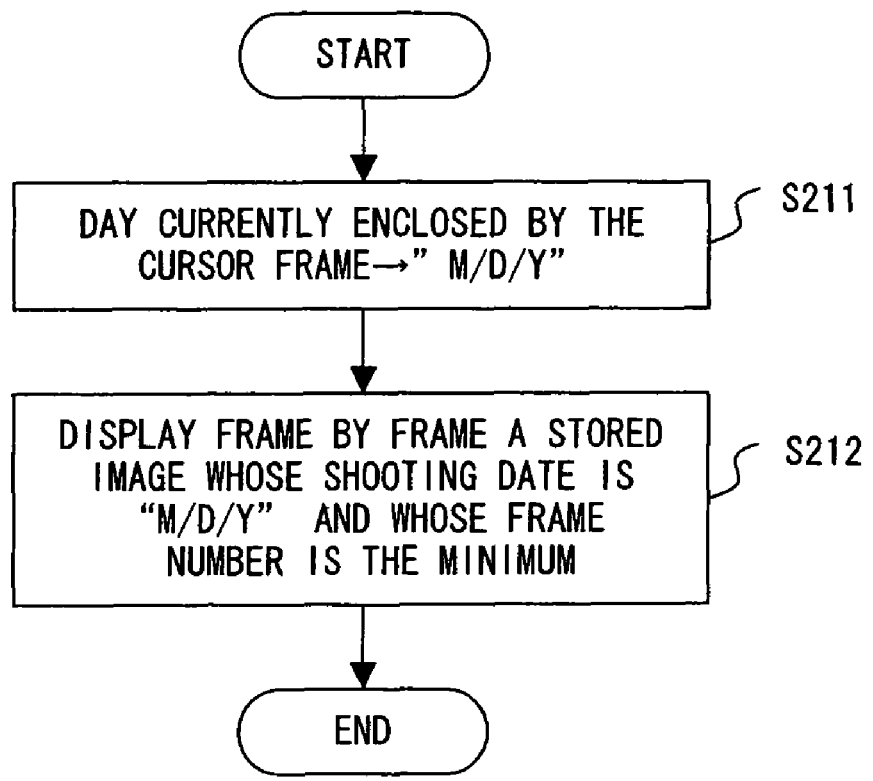
F I G. 9

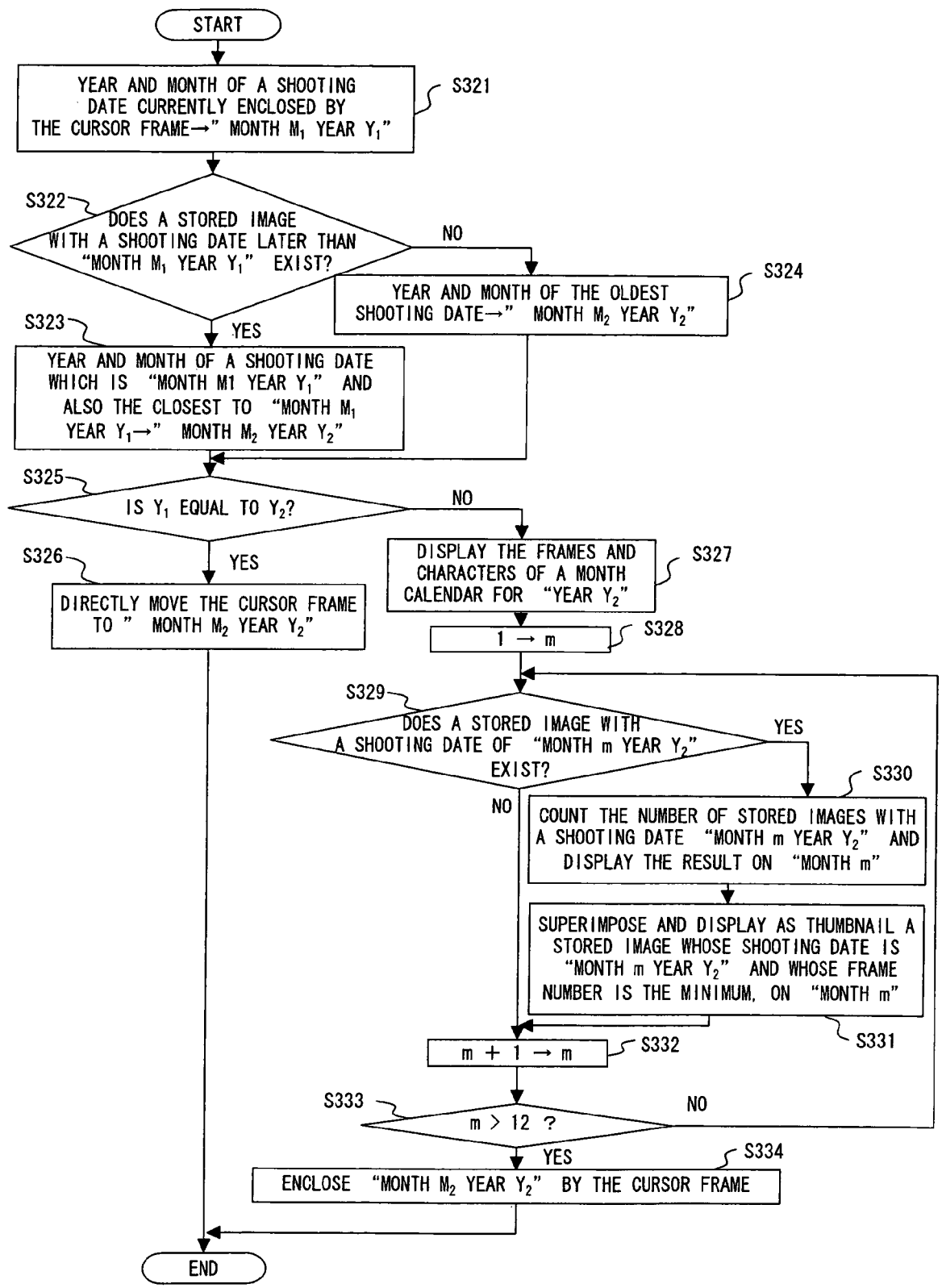
F I G. 1 4

IMAGE DISPLAY DEVICE FOR DISPLAYING A CALENDAR CORRESPONDING TO A SENSED IMAGE

CROSS REFERENCE TO RELATED APPLICATIONS

This application claims benefits of Japanese Patent Application No. 2004-293086, filed Oct. 5, 2004, the contents of which are incorporated by this reference.

BACKGROUND OF THE INVENTION

1. Field of the Invention

The present invention relates to a technology for managing sensed images, and more particularly, relates to a technology suited to searching for sensed images managed in connection with a sensed time.

2. Description of the Related Art

For example, Japanese Patent Application No. 2004-260710 discloses a technology for displaying a day calendar for one month on the display unit of a digital still camera and also displaying images recorded in a memory card mounted on the digital still camera, with embedded in the date field of the calendar, corresponding the sensed date of each image. This patent reference also discloses a technology for display images sensed on the date as a list on the display unit if a user specifies any date. In this patent reference, any date can be specified in the displayed calendar if a user firstly operates a ring key vertically and horizontally, appropriately moves a specific frame colored differently from other frames enclosing the other date fields of the displayed calendar according to the operation and operating a set key. However, in this technology, sometimes the specific frame is also located on the date field of the displayed calendar, in which no image is embedded, by the operation of the ring key.

Besides, as a technology related to the present invention, there is, for example, Japanese Patent Application No. 2001-169239, which discloses a technology for recording shooting order information in a specific area of each track in advance when recording still video signals, for example, sensing an image, detecting this shooting order information in a disk recording them when displaying the still video signals and displaying each still video signal in shooting order, according to the shooting order information.

SUMMARY OF THE INVENTION

One aspect of the present invention is a device for displaying images. The device comprises a storage unit for storing a sensed image and shooting time information corresponding to the sensed image, a display unit at least provided with a plurality of display areas at consecutive shooting times, for displaying the shooting time in the display area, a specification unit for specifying a display area in which a sensed image corresponding to each shooting time exists as an image-existing area, and an indication unit for visibly indicating an image-existing area of the display areas specified as the image-existing areas, based on a prescribed condition. When the movement of the display area is instructed, the indication unit moves only the image-existing area and indicates the existence of an image.

In the device of the present invention, the display unit can also display the thumbnail of images corresponding to the shooting time as their representative image in addition to display the shooting time.

In the device of the present invention, the shooting time displayed on the display unit can also be a calendar displaying a month and a day, and an image-existing area indicated by the indication unit can also be moved to a calendar displaying a month immediately before or after the currently displayed month.

Another aspect of the present invention is a device for displaying images. The device comprises a storage unit for storing a sensed image and shooting date information corresponding to the sensed images, an image display unit for displaying the sensed image, an operation unit operated for switching a specific sensed image displayed on the image display unit to a calendar including shooting month/day information corresponding to the sensed image, an image switch unit for switching the specific sensed image displayed on the image display unit to the calendar and indicating a shooting date of the sensed image when operating the operation unit, and a specification unit for specifying another shooting month/day than one displayed by the image switch unit, according to the shooting month/day information. If the operation unit is operated when the shooting date of the sensed image is indicated, the image switch unit displays a calendar including a shooting month/day, which is specified by the specification unit and which is earlier or later than the currently displaying shooting month/day, on the image display unit and indicates this shooting date.

In the device of the present invention, the image switch unit can also superimpose and displays the thumbnail of images corresponding to the shooting time as their representative image on the shooting date of the sensed image on the calendar.

BRIEF DESCRIPTION OF THE DRAWINGS

The present invention will be more apparent from the following detailed description when the accompanying drawings are referenced.

FIG. 5 is a flowchart showing the first example of the display image switching process.

FIG. 6 is a flowchart showing the second example of the display image switching process.

FIG. 9 is a flowchart showing the fourth example of the display image switching process.

FIG. 14 is a flowchart showing the eighth example of the display image switching process.

DESCRIPTION OF THE PREFERRED EMBODIMENTS

The preferred embodiments of the present invention are described below with reference to the drawings. Here a case where a camera implements the present invention is described.

Figure 1:
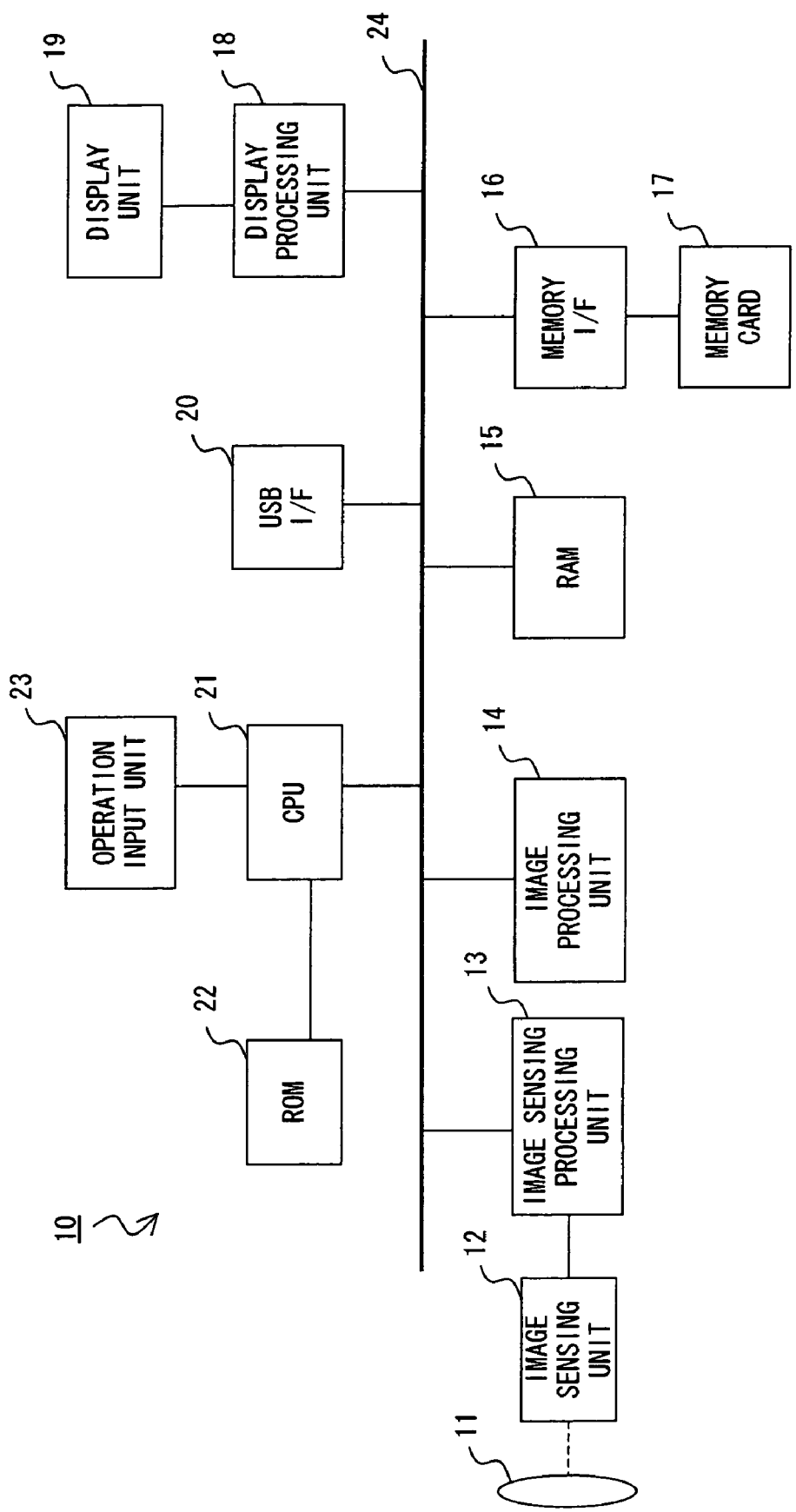
FIG. 1 shows the configuration of a camera for implementing the present invention.

Firstly, FIG. 1 is described. FIG. 1 shows the configuration of a camera 10 for implementing the present invention.

In FIG. 1, each of an image sensing processing unit 13, an image processing unit 14, random-access memory (RAM) 15, a memory interface (I/F) 16, a display processing unit 18, an universal serial bus (USB) interface (I/F) 20 and a central processing unit (CPU) 21 is connected to a bus 24, and a variety of data can be transmitted/received to/from each other under the control of the CPU 21.

An object image sensed by a lens 11 is converted into electrical signals by an image sensing unit 12, such as a charge coupled device (CCD) and is inputted to the image sensing processing unit 13. The image sensing processing unit 13 converts the inputted electrical signals from analog to digital after amplifying it up to a specific size, and outputs image data indicating a sensed image representing a sensed object.

The image processing unit 14 applies image processing, such as a gamma correction, edge emphasis and white-balance correction and the like, of an image represented by the image data to the image data outputted from the image sensing processing unit 13. If necessary, a data compression is applied to the image data when storing the image data in a memory card 17. Furthermore, when displaying an image represented by an image data stored in the memory card 17, data expansion is applied to the image data read from the memory card 17.

The RAM 15 is used as a working memory area if necessary when the image processing unit 14 or the CPU 21 performs a variety of processes.

The memory I/F 16 connects the memory card 17 to the bus 24, and can read/write a variety of data of the memory card under the control of the CPU 21.

The memory card 17 is an image data storage medium, which can be freely attached to/detached from the camera 10, and in its storage area, image data can be managed by the CPU 21 as described later.

The display processing unit 18 converts image data transmitted via the bus 24 from digital to analog and provides the display unit 19 with it.

The display unit 19 can be, for example, a liquid crystal display (LCD) and displays an image represented by image data inputted to the display processing unit 18.

The USB I/F 20 connects the camera 10 to external equipment, such as a personal computer (PC) or the like, and enables the transmission/reception of a variety of data.

The CPU 21 controls the operation of the entire camera 10.

Read-only memory (ROM) 22 stores a variety of data used by a control program which is executed by the CPU 21 or used when executing the program as requested. The CPU 21 can control the described operation by executing the control program. A variety of control by the CPU 21 can be realized by executing the control program by the CPU 21.

An operation input unit 23 is switches operated by the user of the camera 10. The operation input unit 23 receives instructions from a user, corresponding to the operation contents and transfers it to the CPU 21.

Figure 2:
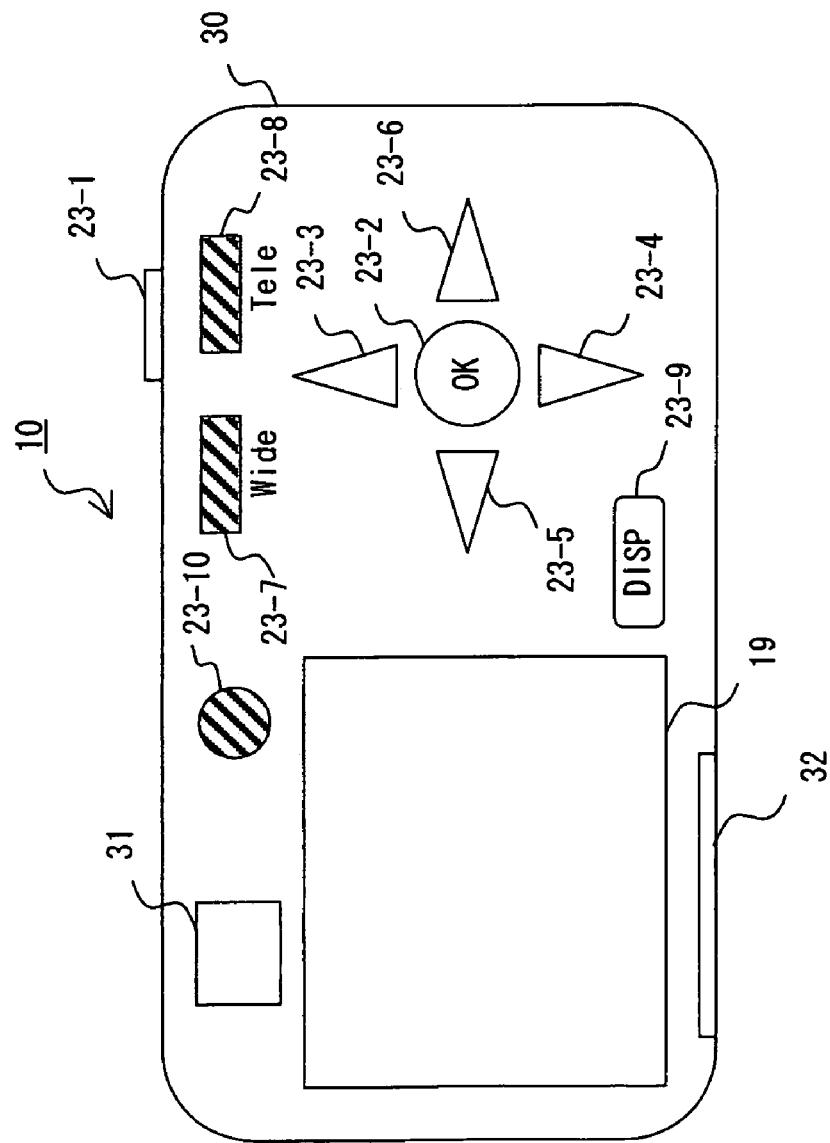
FIG. 2 is the rear view of the camera shown in FIG. 1.

FIG. 2 is the rear view of the camera shown in FIG. 1. A release button 23-1 for mainly obtaining the execution instructions of an image sensing operation, a confirmation button 23-2 for obtaining the execution determination instructions of a variety of operations, a cross button for mainly obtaining direction instructions (an up button 23-3, a down button 23-4, a left button 23-5 and a right button 23-6), a wide button 23-7 for mainly obtaining instructions on a zoom direction when using a zoom function at the time of an image sensing operation, a tele-button 23-8, a display button 23-9 for obtaining instruction to switch the operation mode of the camera 10 to operation mode (display mode) for displaying a stored image and a power button 23-10 for instructing to switch the power on/off of the camera 10 which are provided for a cabinet i.e., a camera housing 30 are all switches constituting the operation input unit 23.

FIG. 2 also shows that a finder 31 and the above-described display unit 19 are provided on the rear surface of the camera housing 30. At the bottom of the camera housing 30, an insertion inlet 32 through which the memory card 17 is inserted.

Next, the image data management structure of the memory card 17 is described with reference to FIG. 3.

In the memory card 17, each piece of image data is managed using folders.

Figure 3:
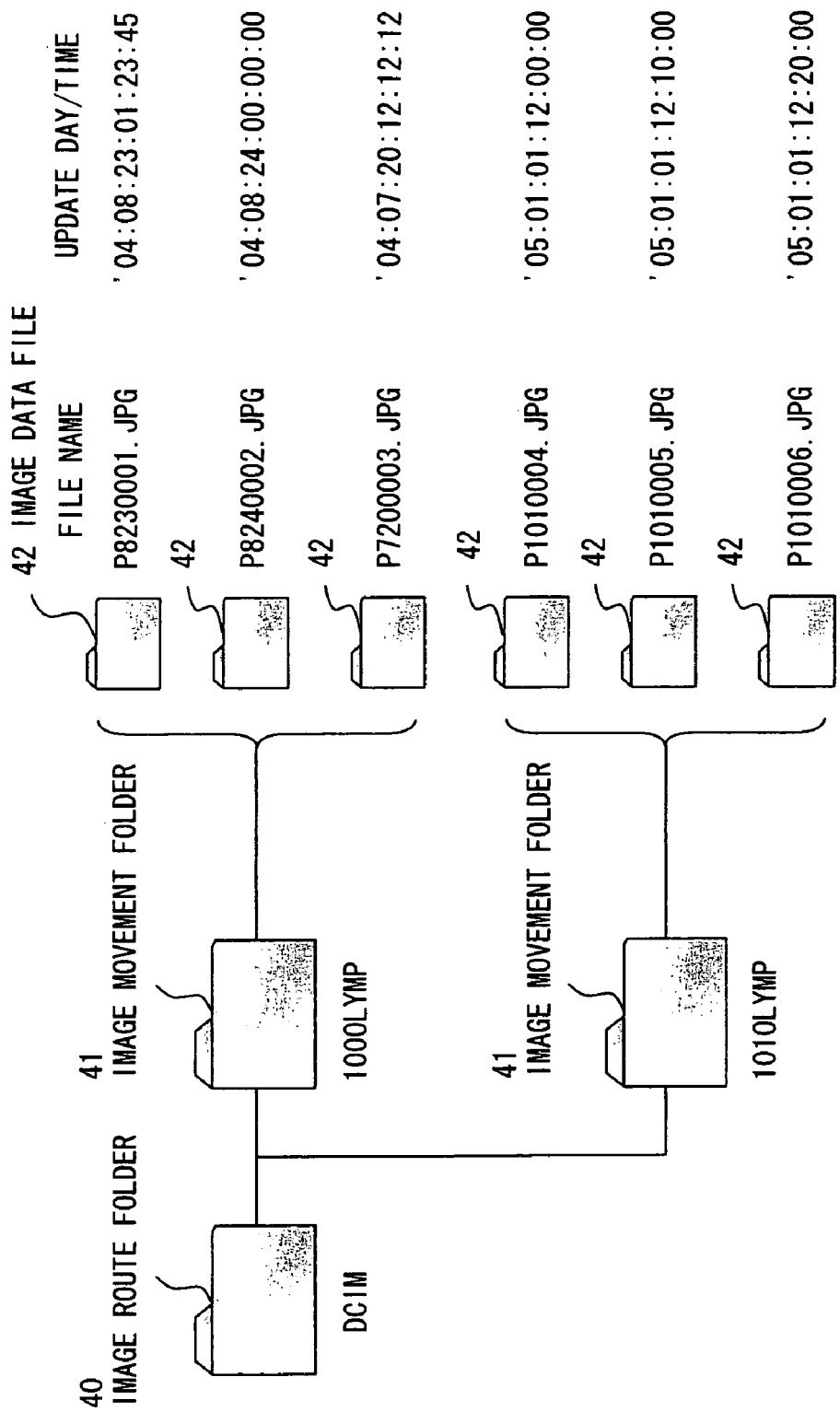
FIG. 3 shows the image data management structure.

In FIG. 3, an image route folder (DCIM folder) 40 is a base folder for storing image data. Each piece of image data representing an image is stored in each image storage folder (a 1000LYMP folder and a 1010LYMP folder) 41 as an image data file 42.

In the memory card 17, the update date of each image data file 42 is managed. If the camera 10 shoots an object, the CPU 21 updates and stores the update day and time of the image data file 42 when storing the image data file 42 of the sensed image in the memory card 17. Therefore, this update date can be used as information about shooting day and time corresponding to the sensed image.

A file name is given to each image data file 42 by the CPU 21 according to a prescribed rule. This file name is composed of a name part of an upper-order 8 digits and an extension part of lower-order 3 digits and is stored in the memory card 17 in connection with an image data file 42.

In this case, the extension indicates the data form of image data. Since all the extensions of the file names of the image data files 42 shown in FIG. 3 are JPG, the data forms of all pieces of file data belong to a so-called joint photographic expert group (JPEG). If the image data file 42 is based on an exchangeable image file format (Exif) rating which is the rating of an image data form, information indicating the shooting day and time of a sensed image is stored in the image data file 42 together with the image data as additional information. Therefore, in this case, information about a shooting day and time corresponding to the sensed image can also be obtained from this additional information.

The second digit following the highest digit P of the name part of the file name of the image data file 42 is selected from total twelve characters of 1-9, A, B and C indicating each month of the calendar to indicate the month of the shooting date of an image represented by this image data. The third and fourth digits following this character indicate the day of the shooting date of the image. Thus, information about a shooting date corresponding to the sensed image can be obtained from these parts of the file name of this image data file 42.

The lower-order four digits of the name part indicate is used to specify an image represented by the image data in the camera 10. For example, it indicates a frame number, which is a serial number attached in shooting order.

Next, a method for displaying an image represented by image data stored in the memory card 17 (hereinafter simply called "stored image") in the camera 10 is described.

In the following description it is assumed that in the memory card 14, the six image data files 42 each with a file name shown in FIG. 3 are stored in two image storage folders 41 as shown in FIG. 3 and the respective update days and times of the image data file 42 are also indicated. As the method for obtaining a shooting day and time of the stored image, of the earlier-described methods, one using the update of an image data file 42 is adopted.

Firstly, a first displaying method is described with reference to FIG. 4.

In this displaying method, if the left button 23-5 and right button 23-6 is operated when displaying stored images frame by frame, a stored image with a frame number immediately before and after, respectively, that of an image currently displayed on the display unit 19 is displayed on the display unit 19. In this case, if the up button 23-3 and down button 23-4 are operated, a stored image with a shooting date immediately before and after that of an image currently displayed on the display unit 19 and displayed on the display unit 19.

Figure 4:
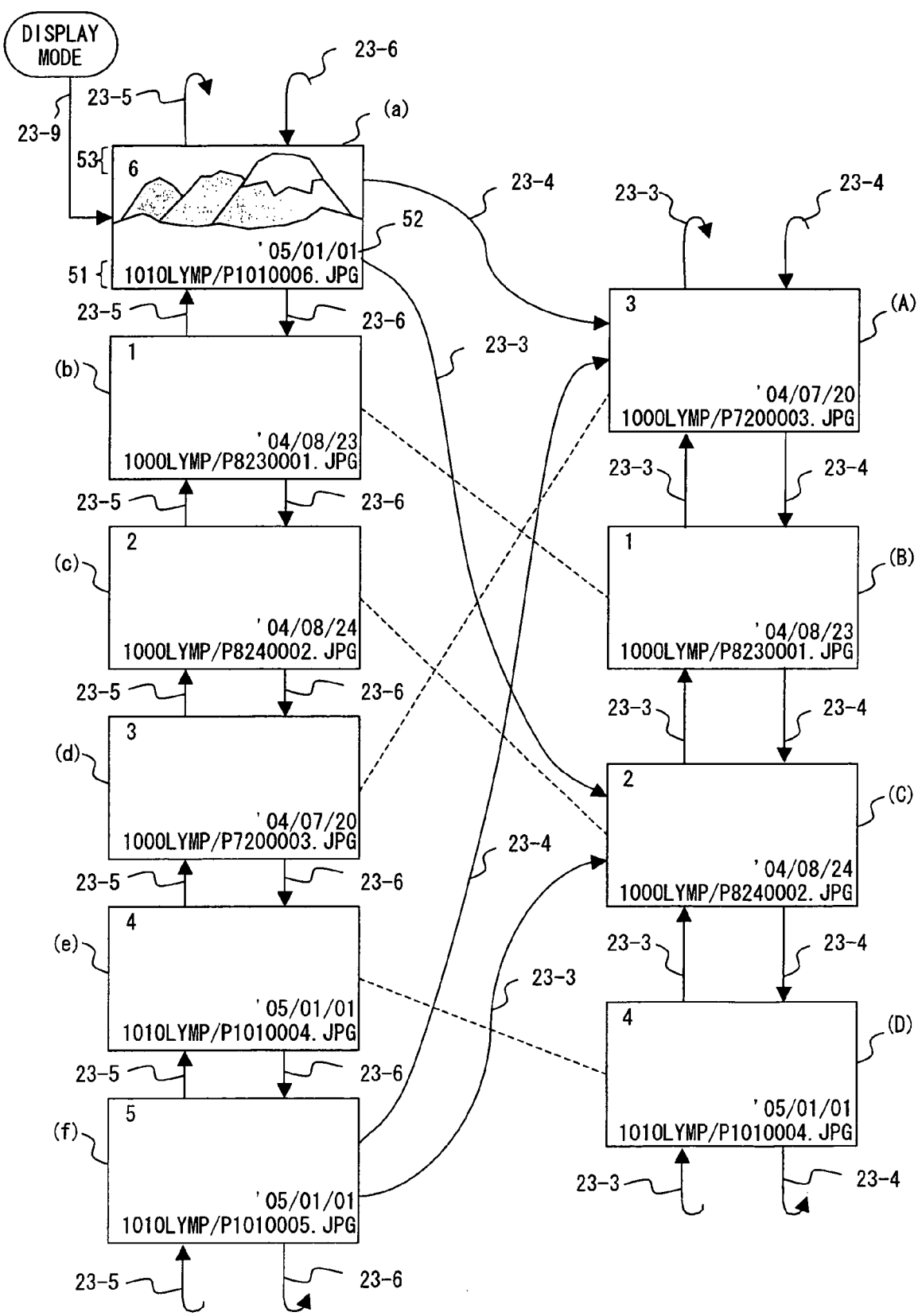
FIG. 4 shows the first method of displaying stored images.

FIG. 4 is described below. In FIG. 4, (a)-(f) and (A)-(D) are all examples of stored images displayed on the display unit 19. On each of these stored images, several character strings are superimposed and displayed on each stored image. These character strings are described below with reference to displayed stored image (a). A file name 51 displayed at the bottom of this stored image indicates the file name of the currently displayed stored image as well as the folder name of an image storage folder 41 in which the image data file 42 of the stored image is stored. At the upper right of the file name 51, a shooting date 52 is displayed to indicate the shooting year/month/day of the currently displayed stored image. Furthermore, in the upper left corner of this stored image, a frame number 53 is displayed to indicate the frame number of the currently displayed stored image.

In the following description, it is assumed that when the CPU 21 displays a stored image on the display unit 19, it also obtains the file name and update date of the image data file 42 of the stored image by referring to the memory card 17 and superimposes/displays the file name 51, shooting date 52 and frame number 53 on the stored image, according to the obtained contents.

The transition of a displayed stored image according to a button operation, shown in FIG. 4 is described below.

Firstly, when a user operates the display mode button 23-9 of the camera 10, the camera 10 starts an operation in the display mode. Then, the CPU 21 retrieves a stored image with the maximum frame number (that is, the latest shot image) from the file names and displays it on the display unit 19. In this case, (a) in FIG. 4 shows the screen displayed on the display unit 19, and a stored image with the maximum frame number "0006" of the file names shown in FIG. 3 is displayed on the display unit 19.

At this moment, if the user operates the right button 23-6 of the camera 10, the CPU 21 searches for a stored image with a frame number immediately after a frame number "6" of the stored image currently displayed on the display unit 19. However, no stored image with a frame number immediately after a frame number "6" exists in FIG. 3. In this case, the CPU 21 retrieves a stored image with the minimum frame number (that is, the oldest shot image) from the file names and displays it on the display unit 19. In this case, (b) in FIG. 4 shows a screen displayed on the display unit 19, and a stored image with the minimum frame number "0001" of the file names shown in FIG. 3 is displayed on the display unit 19.

Then, if the user further operates the right button 23-6, the CPU 21 searches for a stored image with a frame number immediately after a frame number "1" of the stored image currently displayed on the display unit 19 and displays it on the display unit 19. In this case, (c) in FIG. 4 shows a screen displayed on the display unit 19, and a stored image with the frame number "0002" immediately after the frame number "0001" of the file names shown in FIG. 3 is displayed on the display unit 19.

If similarly the user continues to operate the right button 23-6 after this, the CPU 21 sequentially searches a stored image with a frame number immediately after that of a stored image currently displayed on the display unit 19 and displays it on the display unit 19. Thus, the screen displayed on the display unit 19 is circulated and switched in order of (d), (e), (f), (a), (b) and so on.

However, if the user operates the left button 23-5 when (a) is displayed on the display unit 19, the CPU 21 searches for a stored image with a frame number immediately before the frame number "6" of the stored image currently displayed on the display unit 19 and displays it on the display unit 19. Thus, a screen (f) is displayed on the display unit 19, and a stored image with a frame number "0005" immediately before frame number "0006" of the file names shown in FIG. 3 is displayed.

If the user continues to operate the left button 23-5 after this, the CPU 21 sequentially searches a stored image with a frame number immediately before that of a stored image currently displayed on the display unit 19 and displays it on the display unit 19. Thus, the screen displayed on the display unit 19 is circulated and switched in order of (e), (d), (c), (b) and so on.

If the user operates the left button 23-5 when (b) is displayed on the display unit 19, no stored image with a frame number immediately before frame number "1" exists in FIG. 3. Therefore, the CPU 21 retrieves a stored image with the maximum frame number (that is, the latest shot image) from the file names instead and displays it on the display unit 19. Thus, in this case, (a) is displayed on the display unit 19. If the user continues to operate the left button 23-5 after this, the screen displayed on the display unit 19 is circulated and switched in order of (f), (e), (d), (c), (b), (a) and so on.

However, if the user operates the down button 23-4 when (a) is displayed on the display unit 19, the CPU 21 searches a stored image with a shooting date immediately after the shooting date "05/01/01" of a stored image currently display on the display unit 19 and displays it on the display unit 19. However, since a stored image with no shooting date immediately after the shooting date "05/01/01" of the stored image currently displayed on the display unit 19 exists in FIG. 3, in this case, a stored image with the oldest shooting date is retrieved from the file names and is displayed on the display unit 19. In this case, (A) is displayed on the display unit 19, and a stored image with the oldest shooting date "04/07/20" of the file names shown in FIG. 3 is displayed. Since (A) is for a stored image with a frame number "3", it is the same as (d).

Even if the user operates the down button 23-4 for example, when (f) is displayed on the display unit 19, the shooting date of a stored image currently displayed on the display unit 19 is "05/01/01" as (a) is displayed on the display unit 19. Therefore, the CPU 21 searches for a stored image with a shooting date immediately after "05/01/01" and displays it on the display unit 19. However, in this case too, since no stored image with a shooting date immediately after "05/01/01" in FIG. 3, a stored image with the oldest shooting date is retrieved from the file names instead and is displayed on the display unit 19. Thus, in this case too, (A) is displayed on the display unit 19.

If the user further operates the down button 23-4 when (A) is displayed, the CPU 21 searches for a stored image with a shooting date immediately after the shooting date "04/07/20" of the stored image currently displayed on the display unit 19. In this case, (B) is for the stored image displayed on the display unit 19, and a stored image with a shooting date "04/08/20" immediately after "04/07/20" of the file names shown in FIG. 3. Since (B) is the same as for a stored image with a frame number "1", it is the same as (b).

If similarly the user further continues to operate the down button 23-4 after this, the CPU 21 sequentially searches for a stored image with a shooting date immediately after that of the stored image currently displayed on the display unit 19 and displays it on the display unit 19. Thus, the screen displayed on the display unit 19 is circulated and switched in order of (C), (D), (A) and so on. In this case, since (C) is for a stored image with a frame number "2", it is the same as (c). Since (D) is for a stored image with a frame number "4", it is the same as (e).

However, if the user operates the up button 23-3 when (a) is displayed on the display unit 19, the CPU 21 searches for a stored image with a shooting date immediately before the shooting date "05/01/01" of the stored image currently displayed on the display unit 19 and displays it on the display unit 19. Thus, in this case, (C) is displayed on the display unit 19, and a stored image with a frame number "04/07/20" immediately before "05/01/01" of the file names shown in FIG. 3 is displayed.

Even if the user operates the up button 23-3, for example, when (f) is displayed on the display unit 19, the shooting date of the stored image currently displayed on the display unit 19 is "05/01/01" as (a) is displayed on the display unit 19. Therefore, the CPU 21 searches for a stored image with a shooting date immediately before "05/01/01" and displays it on the display unit 19. Thus, in this case too, (c) is displayed on the display unit 19.

If the user further continues to operate the up button 23-3 after this, the CPU 21 sequentially searches for a stored image with a shooting date immediately before that of the stored image currently displayed on the display unit 19. Thus, the screen displayed on the display unit 19 is switched in order of (B), (A) and so on.

If the user further operates the up button 23-3 when (A) is displayed on the display unit 19, no stored image with a shooting date immediately before "04/07/20" exists in FIG. 3. Therefore, a stored image with the latest shooting date is retrieved fro the file names instead and is displayed on the display unit 19. Thus, in this case, (D) is displayed on the display unit 19. If the user further continues to operate the up button 23-3 after this, the screen displayed on the display unit 20 is switched in order of (C), (B), (A) and so on.

If a plurality of stored images to be displayed, specifically if a plurality of stored images with the same shooting date exist when the up button 23-3 or down button 23-4 is operated, of the stored images with the same shooting date, a stored image with the minimum frame number is displayed on the display unit 19 as their representative stored image. Alternatively, a stored image with the maximum frame number can also be displayed on the display unit 19 as their representative stored image. Alternatively, a stored image with the earliest shooting time can also be displayed on the display unit 19 as their representative stored image. Further alternatively, a stored image with the latest shooting time can also be displayed on the display unit 19 as their representative stored image.

Next, FIG. 5 is described below. FIG. 5 is a flowchart showing the first example of the display image switching process. The CPU 21 performs this process when the right button 23-6 is operated at the performing of frame-by-frame display to realize the display switching of a stored image on the display unit 19 according to the operation of the right button 23-6 which has been described with reference to FIG. 4.

Firstly, in S101, the frame number (that is, figure of a frame number 53) of a stored image currently displayed on the display unit 19 is obtained and is assigned to a variable NUM.

In S102, the memory card 17 is referenced, and it is determined whether the maximum frame number of a stored image coincides with the figure of the variable NUM. If it is determined that both are matched (the determination result is yes), it is regarded that the stored image currently displayed on the displayed unit 19 has the maximum frame number, and in S103, "1" is assigned to the variable NUM. Then, the process proceeds to S105. However, if in S102 it is determined the both are not matched (the determination result is no), it is regarded that a stored image with a frame number immediately after that of the stored image currently displayed on the display unit 19 exists, and in S104, the value of the variable NUM is incremented (a result obtained by adding "1" to the value of the variable NUM is assigned to the variable NUM again.

In S105, the display on the display unit is switched and a stored image having the current value of the variable NUM as a frame number is displayed. Then, the process shown in FIG. 5 is terminated.

If the CPU 21 performs the above-described control process, the switching of frame-by-frame display of a stored image is realized on the display unit 19, according to the operation of the right button 23-6.

The control process of the CPU 21 of realizing the display switching of a stored image on the display unit 19 according to the operation of the left button 23-5 which has been described with reference to FIG. 4 is basically the same as shown in FIG. 5. In S102, it is determined whether the minimum frame number of a stored image coincides with the figure of the variable NUM. In S103, the maximum frame number of a stored image is assigned to the variable NUM. Furthermore, in S104, the value of the variable NUM is decremented ("1" is subtracted).

Next, FIG. 6 is described below. FIG. 6 is a flowchart showing the second example of the display image switching process.

The CPU 21 performs this process when the down button 23-4 is operated at the performing of frame-by-frame display to realize the display switching of a stored image on the display unit 19 according to the operation of the down button 23-4 which has been described with reference to FIG. 4.

Firstly, in S111, the shooting date (that is, figure of a shooting date) of a stored image currently displayed on the display unit 19 is obtained and is divided into a year, a month and a day, which are assigned to variables $Y_1$, $M_1$ and $D_1$, respectively.

In S112, the memory card 17 is referenced, and it is determined whether a stored image whose date $Y_1/M_1/D_1$ is later than the shooting date indicated by the variables $Y_1$, $M_1$ and $D_1$ exists. If it is determined that such a stored image exists (the determination result is yes), in S113, the shooting date of a stored image, which is later than $Y_1/M_1/D_1$ and the latest is obtained and is divided into a year, a month and a day, which are assigned to the variables $Y_2$, $M_2$ and $D_2$, respectively. Then, the process proceeds to S115. If in S112, it is not determined that such a stored image exits (the determination result is no), it is regarded that the currently displayed stored image is shot close to the present time. Then, in S114, the oldest shooting date of a stored image is obtained and is divided into a year, a month and a day, which are assigned to the variables $Y_2$, $M_2$ and $D_2$, respectively.

In S115, the display on the display unit is switched, and of stored images with the shooting date $Y_2/M_2/D_2$, a stored image with the minimum frame number is displayed. Then, the process shown in FIG. 6 is terminated.

If the CPU 21 performs the above-described control process, the switching of frame-by-frame display can be realized on the display unit 19, according to the operation of the down button 23-4.

The control process of the CPU 21 of realizing the display switching of a stored image on the display unit 19 according to the operation of the up button 23-3 which has been described with reference to FIG. 4 is basically the same as shown in FIG. 6. In S112, it is determined whether a stored image with a shooting date earlier than $Y_1/M_1/D_1$ exists. Then, in S113, a shooting date of a stored image which is earlier than $Y_1/M_1/D_1$ and is closest to the date is obtained and is divided into a year, a month and a day, which are assigned to variables $Y_2$, $M_2$ and $D_2$, respectively. Furthermore, in S114, a shooting date closest to the present time is obtained from the stored images and is divided into a year, a month and a day, which are assigned to variables $Y_2$, $M_2$ and $D_2$, respectively.

Next, a second display method is described with reference to FIG. 7.

In this display method, if the wide button 23-7 is operated when displaying a stored image frame by frame as in the first method, a day calendar (a calendar displaying one month in units of days from the first day until the last day on one screen) including the shooting date of a stored image currently displayed on the display unit 19 is displayed on the display unit 19, and also stored imaged with the same date are superimposed and displayed as thumbnail on each date figure of the day calendar. Furthermore, a specific date is enclosed by a special frame. If the tele-button 23-8 is operated when this day calendar is displayed on the display unit 19, the currently thumbnail-displayed stored images enclosed by the special frame on the day calendar that is currently displayed on the display unit 19 is enlarged and displayed (each original frame is displayed) on the display unit 19. Furthermore, if the left button 23-5 or right button 23-6 is operated when this day calendar is displayed on this display unit 19, the specific frame is moved to a date field corresponding to a shooting date immediately before or after the date currently enclosed by the special frame, of the shooting dates of the stored images.

Figure 7:
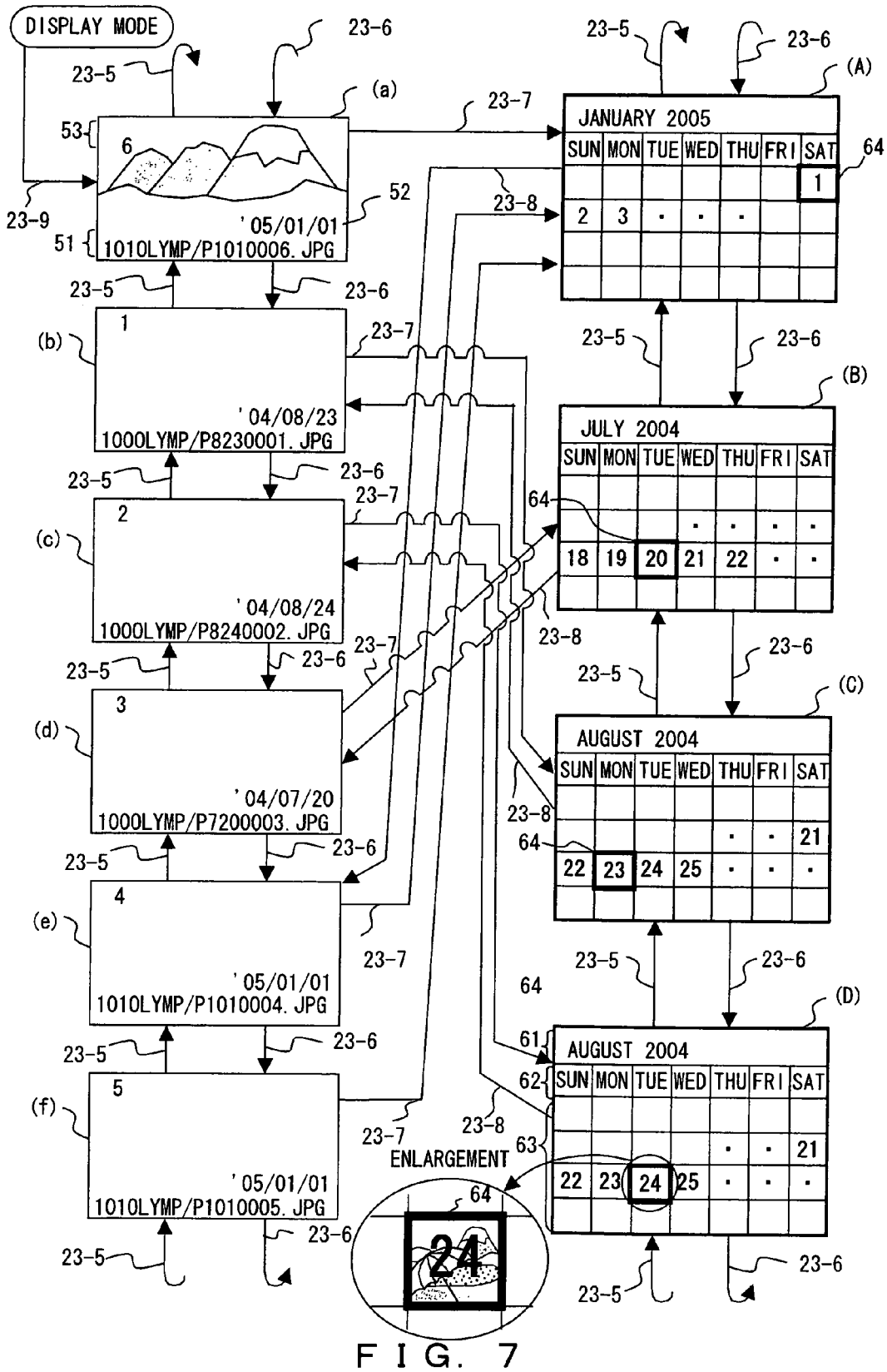
FIG. 7 shows the second method of displaying stored images.

Next, FIG. 7 is described. In FIG. 7, (a)-(f) and (A)-(D) show screens displayed on the display unit 19. Of these, (a)-(f) are the same as shown in FIG. 4.

In FIG. 7, (A)-(D) are the day calendars. This day calendar is described below with reference to (D). On the top of this screen, a year/month display 61 indicating a year and a month is located. Under it, a week-day display 62 indicating the seven days of a week is located. Further under it, a date field 63 is located. Each row of the date field 63 indicates the seven days of each week and each column of the date field 63 indicates each day of the week.

Although each day of the date field 63 is enclosed by a thin frame, one of the days (the $24^{th}$ day in (D)) is enclosed by a cursor frame 64. Since the cursor frame 64 is different from a frame enclosing the other days in thickness, color and the like, a user can be visually notified of an area enclosed by the cursor frame 64. As known from an enlargement located in the vicinity of the cursor frame 64 in (D), in the day area 63 enclosed by the cursor frame 64, stored images with the same date as the day are superimposed and displayed as thumbnail on the date "24".

This thumbnail can also be superimposed and displayed on a date field 63 not enclosed by the cursor frame 64.

The transition of a screen according to a button operation, shown in FIG. 7 is described below.

Firstly, when a user operates the display mode button 23-9 of the camera 10, the camera 10 starts an operation in a display mode. Then, the CPU 21 retrieves a stored image with the maximum frame number (that is, the latest image) from file names and displays it on the display unit 19. In this case, (a) is displayed on the display unit 19, and a stored image with the maximum frame number "0006" of the file names shown in FIG. 3 is displayed.

Since a screen transition according to the operation of the right button 23-6 or left button 23-5 in the case where one of (a)-(f) is displayed on the display unit 19 is the same as in the first method, its description is omitted.

However, if the user operates the wide button 23-7 when (a) is displayed on the display unit 19, the CPU 21 switches the display on the display unit to display the day calendar for "January 2005" which is the shooting date of a stored image displayed so far. Furthermore, the CPU 21 displays the cursor 64 on the date "$1^{st}$" in the date field 63 of the day calendar, which is the shooting date of this stored image to notify the user of the shooting date to superimpose and thumbnail-display the stored image on the character "1" of the day field 63. In this case, (A) is displayed on the display unit 19.

If the user operates the wide button 23-7 when (b) is displayed on the display unit 19, the CPU 21 switches the display on the display unit to display the day calendar for "August 2004" which is the shooting date of a stored image displayed so far. Furthermore, the CPU 21 displays the cursor 64 on the date "23rd" in the date field 63 of the day calendar, which is the shooting date of this stored image to notify the user of the shooting date to superimpose and thumbnail-display the stored image on the character "23" of the day field 63. In this case, (C) is displayed on the display unit 19.

Similarly, if the user operates the wide button 23-7 when (c) is displayed on display 19, the screen of the display unit 10 is switched to (D). If the user operates the wide button 23-7 when (d) is displayed on display 19, the screen of the display unit 10 is switched to (B). If the user operates the wide button 23-7 when (e) or (f) is displayed on display 19, the screen of the display unit 10 is switched to (A).

However, if the user operates the tele-button 23-8 when (A) is displayed on the display unit 19, the CPU 21 switches the display on the display unit to display frame by frame a stored image with a shooting date "'05/01/01" which is enclosed by the cursor frame 64 in the date field 63 of the day calendar for "January 2005" displayed so far, on the display unit 19.

As known from FIG. 3, three stored images with a shooting date "'05/01/01" exists in FIG. 3. In this preferred embodiment, if a plurality of stored images with the same shooting date exist, one with the minimum frame number of the stored images with the same shooting date is displayed on the display unit 19 as the representative one of the stored images with the same shooting date. Thus, as a result, (e) is displayed on the display unit 19.

Alternatively, of the stored images with the same shooting date, one with the maximum frame number can also be displayed on the display unit 19 as their representative one.

Alternatively, one with the earliest shooting time can also be displayed as their representative one. Further alternatively, one with the oldest shooting time can also be displayed as their representative one.

If the user operates the tele-button 23-8 when (B) is displayed on the display unit 19, the CPU 21 switches the display on the display unit to display frame by frame a stored image with a shooting date "'04/07/20" which is enclosed by the cursor frame 64 in the date field 63 of the day calendar for "July 2004" displayed so far, on the display unit 19. Thus, in this case, (d) is displayed on the display unit 19.

Similarly, if the user operates the tele-button 23-8 when (C) is displayed on the display unit 19, the screen of the display unit 19 is switched to (b). If the user operates the tele-button 23-8 when (D) is displayed on the display unit 19, the screen of the display unit 19 is switched to (c).

If the user operates the right button 23-6 when (A) is displayed on the display unit 19, the CPU 21 searches for an stored image with a shooting date immediately after "'05/01/01" encircled by the cursor frame 64 in the date field 63 of the day calendar for "January 2005" displayed so far. However, in this case, since no stored image with a shooting date later than "May 1, 2001" exists in FIG. 3, one with the oldest shooting date is searched for, and a day calendar in which the date field 63 of the searched shooting data is enclosed by the cursor frame 64 and also stored images with the shooting date are superimposed and displayed as thumbnail on the character of the date field 63 is displayed on the display unit 19. Thus, in this case, (B) is displayed on the display unit 19, and a day calendar for "July 2004" in which stored images with the shooting date are displayed and also the oldest shooting date "'04/07/20" in the date field 63 of the stored images shown in FIG. 3, encircled by the cursor frame 64 is superimposed and displayed as thumbnail on the character "20" of the date field 63 is displayed.

Then, if the user operates the right button 23-6, the CPU 21 searches for a shooting date immediately after "'04/07/20", enclosed by the cursor frame 64 in the date field 63 of the day calendar for "July 2004" displayed so far, of the shooting dates of the images stored on the memory card 17, and displays a day calendar in which the date field 63 of the searched shooting data is enclosed by the cursor frame 64 and also stored images with the shooting date are super imposed and displayed as thumbnail on the character of the date field 63 is displayed on the display unit 19. In this case, (C) is displayed on the display unit 19, and a day calendar in which the date field 63 of the searched shooting data is enclosed by the cursor frame 64 and also stored images with the shooting date are super imposed and displayed as thumbnail on the character of the date field 63 is displayed on the display unit 19. In this case, (C) id displayed on the display unit 19, and a day calendar in which the date field 63 for "'04/08/23", being a shooting date immediately after "'04/07/20" of the shooting data shown in FIG. 3 is enclosed by the cursor frame 64 and also stored images with the shooting date are superimposed and displayed as thumbnail on the character "23" of the date field 63 is displayed.

After this, similarly, if the user further continues to operate the right button 23-6, the CPU 21 searches for a shooting date immediately after the date enclosed by the cursor frame 64 in the date field 63 of the day calendar displayed so far and sequentially displays day calendars in which the searched shooting date is enclosed by the cursor frame 64 in the date field 63 and also stored images with the shooting date are superimposed and displayed as thumbnail on the character of the date field 63 on the display unit 19. In this case, the screen of a stored image on the display unit 19 is circulated and switched in order of (D), (A), (B), (C) and so on.

However, if the user operates the left button 23-5 when (A) is displayed on the display unit 19, the CPU 21 searches for a shooting date immediately before the date "'05/01/01" enclosed by the cursor frame 64 in the date field 63 of the day calendar for "January 2005" displayed so far of the shooting dates of images stored on the memory card 17 and displays a day calendar in which the searched shooting date is enclosed by the cursor frame 64 in the date field 63 and also stored images with the shooting date are superimposed and displayed as thumbnail on the character of the date field 63, on the display unit 19. Thus, in this case, (D) is displayed on the display unit 19, and a day calendar for "August 2004" in which the date field 63 for "'04/08/24", being a shooting date immediately before "'05/01/01", of the shooting dates of stored images shown in FIG. 3 is enclosed by the cursor frame 64 and stored images with the shooting date are superimposed and displayed as thumbnail on the character "24" of the date field 63 is displayed.

After this, similarly, if the user further continues to operate the left button 23-5, the CPU 21 searches for a shooting date immediately before the date enclosed by the cursor frame 64 in the date field 63 of the day calendar displayed so far and displays a day calendar in which the searched shooting date is enclosed by the cursor frame 64 in the date field 63 and also stored images with the shooting date are superimposed and displayed as thumbnail on the character of the date field 63 on the display unit 19. In this case, the screen of a stored image on the display unit 19 is circulated and switched in order of (C), (B) and so on.

If the user further operates the left button 23-5 when (B) is displayed on the display unit 19, no storage images with a shooting date earlier than "'04/07/20" exist in FIG. 3. In this case, instead a stored image with the closest date is searched and a day calendar in which the searched shooting date of the date field 63 is enclosed by the cursor frame 64 and also stored images with the shooting date are superimposed and displayed as thumbnail on the character of the date field 63 is displayed on the display unit 19. Thus, in this case, (A) is displayed on the display unit 19. If the user further continues to operate the left button 23-5, the screen of a stored image on the display unit 19 is switched in order of (D), (C), (B), (A) and so on.

As known from FIG. 3, three stored images with a shooting date "'05/01/01" exist in FIG. 3. In this preferred embodiment, if a plurality of stored images with the same shooting date exist, one with the minimum frame number of the stored images with the same shooting date is displayed on the display unit 19 as the representative one of the stored images with the same shooting date. Thus, as a result, if a day calendar (A) is displayed on the display unit 19, a stored image with a frame number "1" is superimposed and displayed as thumbnail on the character "1" if the date field 63.

Alternatively, of the stored images with the same shooting date, one with the maximum frame number can also be displayed on the display unit 19 as their representative one. Alternatively, one with the earliest shooting time can also be displayed as their representative one. Further alternatively, one with the latest shooting time can also be displayed as their representative one.

Figure 8:
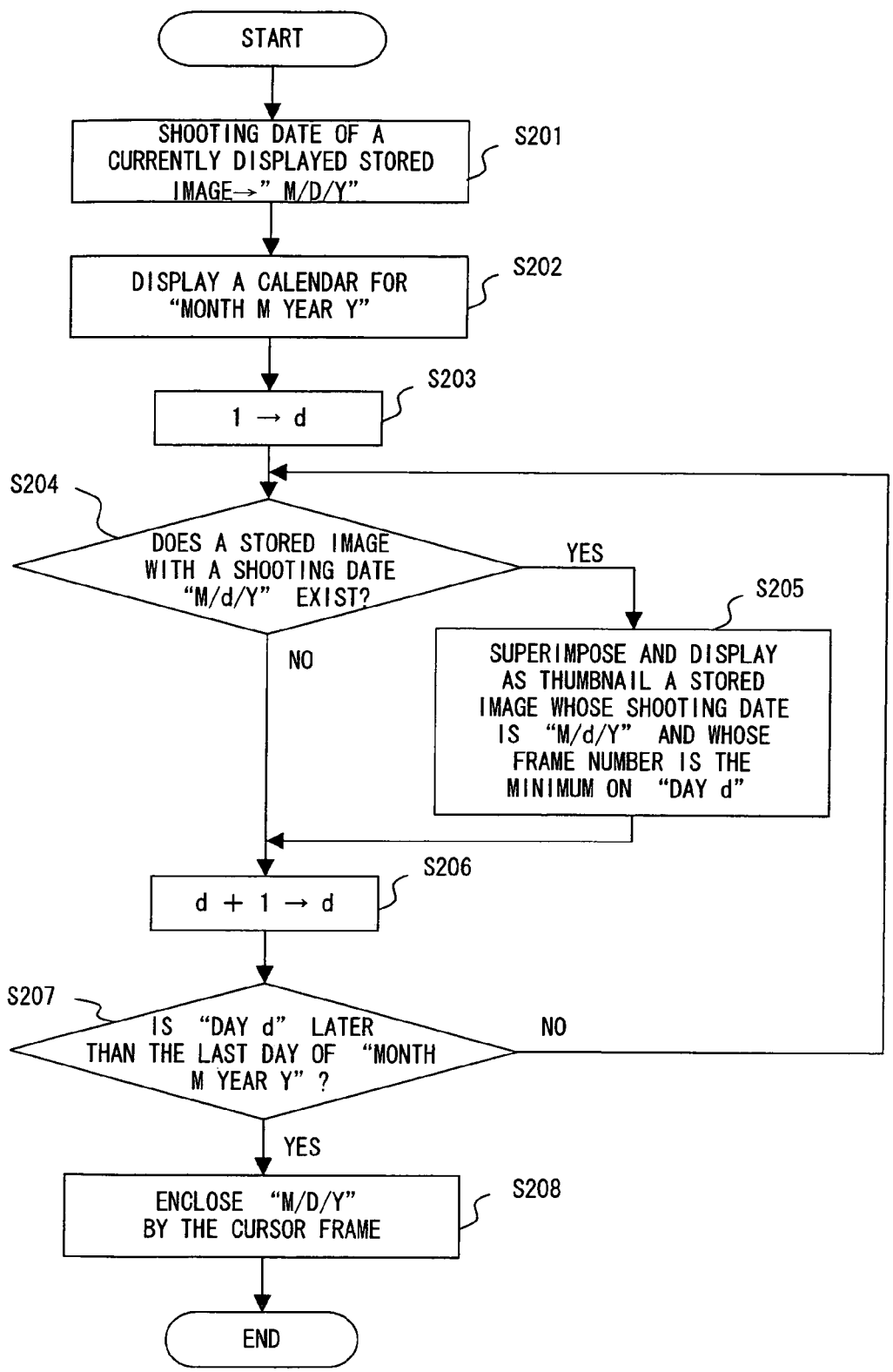
FIG. 8 is a flowchart showing the third example of the display image switching process.

Next, FIG. 8 is described below. FIG. 8 is a flowchart showing the third example of the display image switching process. The CPU 21 performs this process when the wide button 23-7 is operated at the performing of frame-by-frame display to realize the display switching of the display unit 19 according to the operation of the wide button 23-7 described with reference to FIG. 7.

Firstly, in S201, the shooting date (that is, the figure of the shooting date 52) of a stored image currently displayed on the display unit 19 is obtained and is divided into a year, a month and a day, which are assigned to variables Y, M and D, respectively.

In S202, a day calendar for month A year Y as exemplified as (A)-(D), whose year and month are indicated by variables Y and M (whose year/month display 61 indicates month A year Y, which includes a week-day display 62 and in which date fields 63 for "month m year Y" from the $1^{st}$ day until the last day are arrayed corresponding to the week-day display 62) is generated and is displayed on the display unit 19.

In S203, a value "1" is assigned to a variable d.

In S204, the memory card 17 is referenced, and it is determined whether a stored image with a shooting date "M/d/Y" indicated by variables Y, M and d exits. Only if it is determined that such a stored image exists (the determination result is yes), in S205 one with the minimum frame number of the stored images with a shooting date "M/d/Y" is superimposed and displayed as thumbnail on a date field 63 for the shooting date ("day d") in the day calendar currently displayed on the display unit 19.

In S206, the value of variable d is incremented (a result obtained by adding "1" to the value of variable d is assigned to variable d again).

In S207, it is determined whether "day d" indicated by the current value of variable d indicates a date later than the last day of "month m year Y". If it is determined that "day d" is later than the last day (the determination result is yes), the process returns to S204 and the above-described process is repeated. By repeating this process, stored images are displayed as thumbnail on each date field 63 of the day calendar.

In S208, the location of the date field 63 of "M/D/Y" in the day calendar currently displayed on the display unit 19 (that is, an area in which stored imaged displayed frame by frame before the operation of the wide button 23-7) is recognized and the cursor frame 64 enclosing the date field 63 is displayed. Then, the process shown in FIG. 8 is terminated.

If the CPU 21 performs the above-described control process, the frame-by-frame display of a stored image according to the operation of the wide button 23-7 can be switched to its day calendar display.

Next, FIG. 9 is described. FIG. 9 is a flowchart showing the fourth example of the display image switching process. The CPU 21 performs this process if the tele-button 23-8 is operated when a day calendar is displayed to switch the display on the display unit 19 according to the operation of the tele-button 23-8 described with reference to FIG. 7.

Firstly, in S211, a date in the date field 63 enclosed by the cursor frame 64 in the day calendar currently displayed on the display unit 19 is obtained and is divided into a year, a month and a day, which are assigned to variables Y, M and D, respectively.

In S212, the display on the display unit 19 is switched, and one with the minimum frame number of the stored images with a shooting date "M/D/Y" is displayed frame by frame and is displayed on the display unit 19. Then, the process shown in FIG. 9 is terminated.

If the CPU 21 performs the above-described control process, the day display can be switched to the frame-by-frame display of a stored image according to the operation of the tele-button 23-8.

Figure 10:
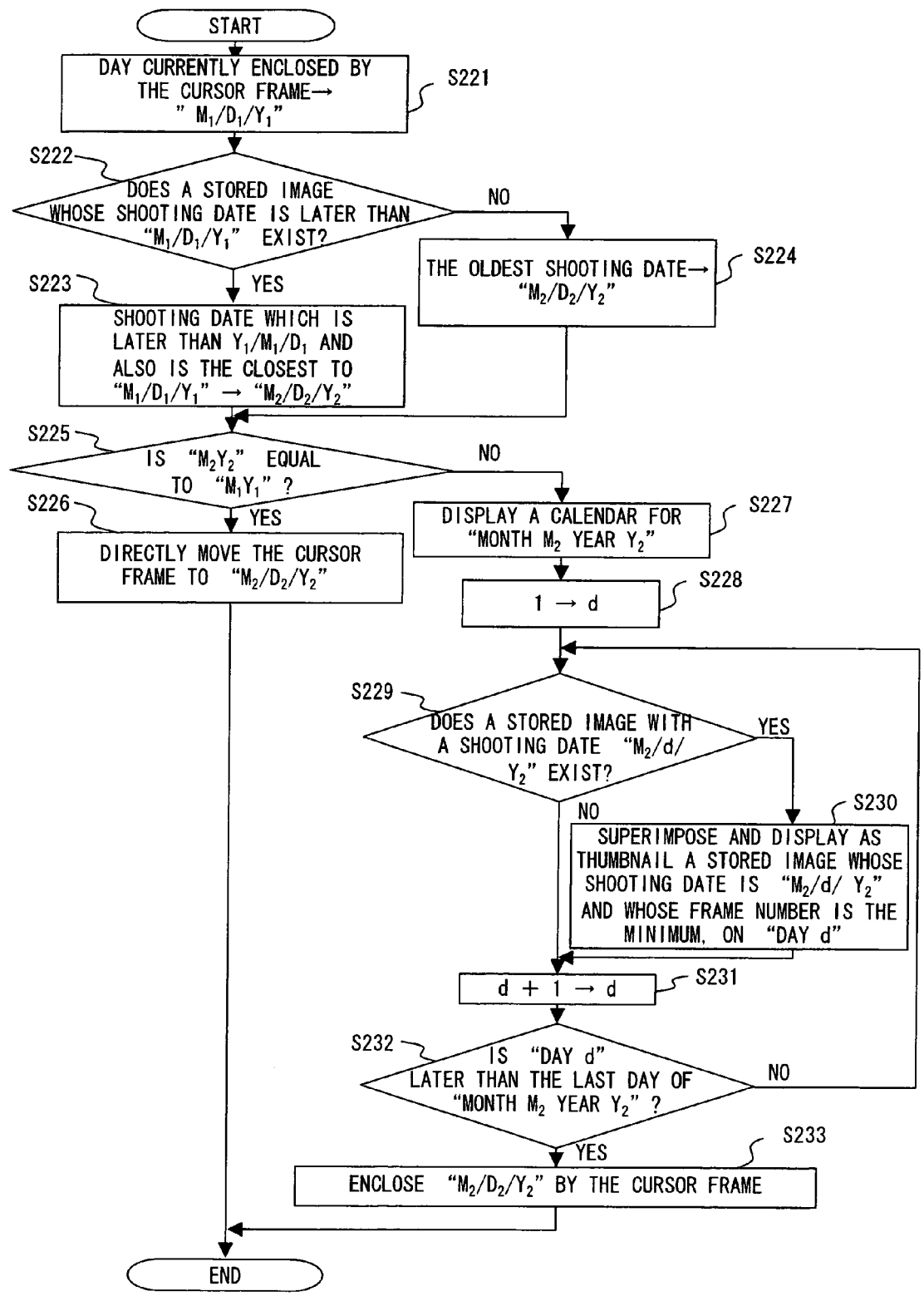
FIG. 10 is a flowchart showing the fifth example of the display image switching process.

Next, FIG. 10 is described below. FIG. 10 is a flowchart showing the fifth example of the display image switching process. The CPU 21 performs this process if the right button 23-6 is operated when a day calendar is displayed to switch the day calendar on the display unit 19 according to the operation of the right button 23-6 described with reference to FIG. 7.

Firstly, in S221, a date in the date field 63 enclosed by the cursor frame 64 in the day calendar currently displayed on the display unit 19 is obtained and is divided into a year, a month and a day, which are assigned to variables $Y_1$, $M_1$ and $D_1$, respectively.

In S222, the memory card 17 is referenced, and it is determined whether a stored image with a shooting date later than $Y_1/M_1/D_1$ indicated by variables $Y_1$, $M_1$ and $D_1$ exits. If it is determined that such a stored image exists (the determination result is yes), in S223 one with a shooting date which is later than $Y_1/M_1/D_1$ and also is the closest to the date is obtained and is divided into a year, a month and a day, which are assigned to variables $Y_2$, $M_2$ and $D_2$, respectively. Then, the process proceeds to S225. If it is not determined that such a stored image exists (the determination result is no), in S224 of the stored images, one with the oldest shooting date is obtained and is divided into a year, a month and a day, which are assigned to variables $Y_2$, $M_2$ and $D_2$, respectively.

In S225, it is determined whether the values of variables $Y_1$ and $M_1$ are equal to those of variables $Y_2$ and $M_2$, respectively. If it is determined that both of them are equal (the determination result is yes), it is regarded that the movement destination of the cursor frame 64 is on the day calendar currently displayed on the display unit 19, and the process proceeds to S226. If it is determined that one or both are not equal (the determination result is no), the process proceeds to S227.

In S226, the location of the date field 63 of $Y_2/M_2/D_2$ in the day calendar currently displayed on the display unit 19 is recognized, and the cursor frame 64 currently enclosing the date field 63 of $D_1$ is moved to the date field 63 of $D_2$. Then, the process shown in FIG. 10 is terminated. Since by this process in S226, the cursor frame 64 is immediately moved from the date field 63 of $D_1$ to that of $D_2$ by only one operation of the right button 23-6, the speed of image retrieval can be improved.

The processes in S227 through S233 are performed when the movement destination of the cursor frame 64 is outside the day calendar currently displayed on the display unit 19. In that case, after the currently displayed day calendar is switched to one for a later month, the cursor frame 64 is displayed on a specific movement destination.

In S227, a day calendar, as shown as (A)-(D) in FIG. 7, with days for $M_2$ month $Y_2$ year indicated by variables $Y_2$ and $M_2$ (whose year/month display 61 indicates $M_2$ month $Y_2$ year, which includes the week-day display 62 and in which the date field 63 of $M_2$ month $Y_2$ year from the first day until the last day are arrayed in connection with the week-day display 62) is generated and is displayed on the display unit 19.

In S228, a value "1" is assigned to variable d.

In S229, the memory card 17 is referenced, and it is determined whether a stored image with a shooting date $Y_2/M_2/d$ indicated by variables $Y_2$, $M_2$ and d exits. Only if it is determined that such a stored image exists (the determination result is yes), in S230 one with the minimum frame number of the stored images with a shooting date $Y_2/M_2/d$ is superimposed and displayed as thumbnail on a date field 63 for the shooting date ("day d") in the day calendar currently displayed on the display unit 19.

In S231, the value of variable d is incremented (a result obtained by adding "1" to the value of variable d is assigned to variable d again).

In S232, it is determined whether "day d" represented by the current value of variable d indicates a date later than the last day of month $M_2$ year $Y_2$. If it is determined that "day d" is later than the last day (the determination result is yes), the process proceeds to S233. If it is not determined that "day d" is later than the last day (the determination result is no), the process returns to S229 and the above-described process is repeated. By repeating this process, stored images are displayed as thumbnail on each date field 63 of the day calendar.

In S233, the location of the date field 63 of $Y_2/M_2/D_2$ in the day calendar currently displayed on the display unit 19 (that is, an area in which stored imaged displayed frame by frame before the operation of the wide button 23-7) is recognized, and the cursor frame 64 enclosing the date field 63 is displayed. Then, the process shown in FIG. 10 is terminated.

If the CPU 21 performs the above-described control process, the day display can be switched to the frame-by-frame display of a stored image and the cursor frame 64 is moved, according to the operation of the right button 23-6.

The control process of the CPU 21 for realizing the display switching of a day calendar and the movement of the cursor 64 according to the operation of the left button, described with reference to FIG. 7 is also basically the same process as this. In that case, in S222 it is determined whether a stored image with a shooting date earlier than $Y_1/M_1/D_1$. In S223, one with a shooting date which is earlier than $Y_1/M_1/D_1$ and also is the closest to the date is obtained and is divided into a year, a month and a day, which are assigned to variables $Y_2$, $M_2$ and $D_2$, respectively. Furthermore, in S224, of the stored images, one with the newest shooting date is obtained and is divided into a year, a month and a day, which are assigned to variables $Y_2$, $M_1$ and $D_2$, respectively. In this case, in the processes in S227 through S233, after the currently displayed day calendar is switched to one for a month earlier than currently displayed, the cursor frame 64 is displayed on a specific movement destination.

Next, a third display method is described with reference to FIG. 11. In this display method, if the wide button 23-7 is operated when displaying a day calendar on the display unit 19 as in the second method, a month calendar (a calendar displaying one year in units of months from January day until December of the year on one screen) including the shooting date of a stored image currently displayed on the display unit 19 is displayed on the display unit 19, and also stored imaged with the month of the date are superimposed and displayed as thumbnail on each date figure of the month in the month field of the month calendar. Furthermore, a specific month is enclosed by a special frame. If the tele-button 23-8 is operated when this month calendar is displayed on the display unit 19, the day calendar of the month in the month field enclosed by the special frame in the month calendar currently displayed on the display unit 19 is displayed. Furthermore, if the left button 23-5 and right button 23-6 is operated when this month calendar is displayed, the special frame is moved to the month of the month field, immediately before and after the month of the month field currently enclosed by the special frame.

Figure 11:
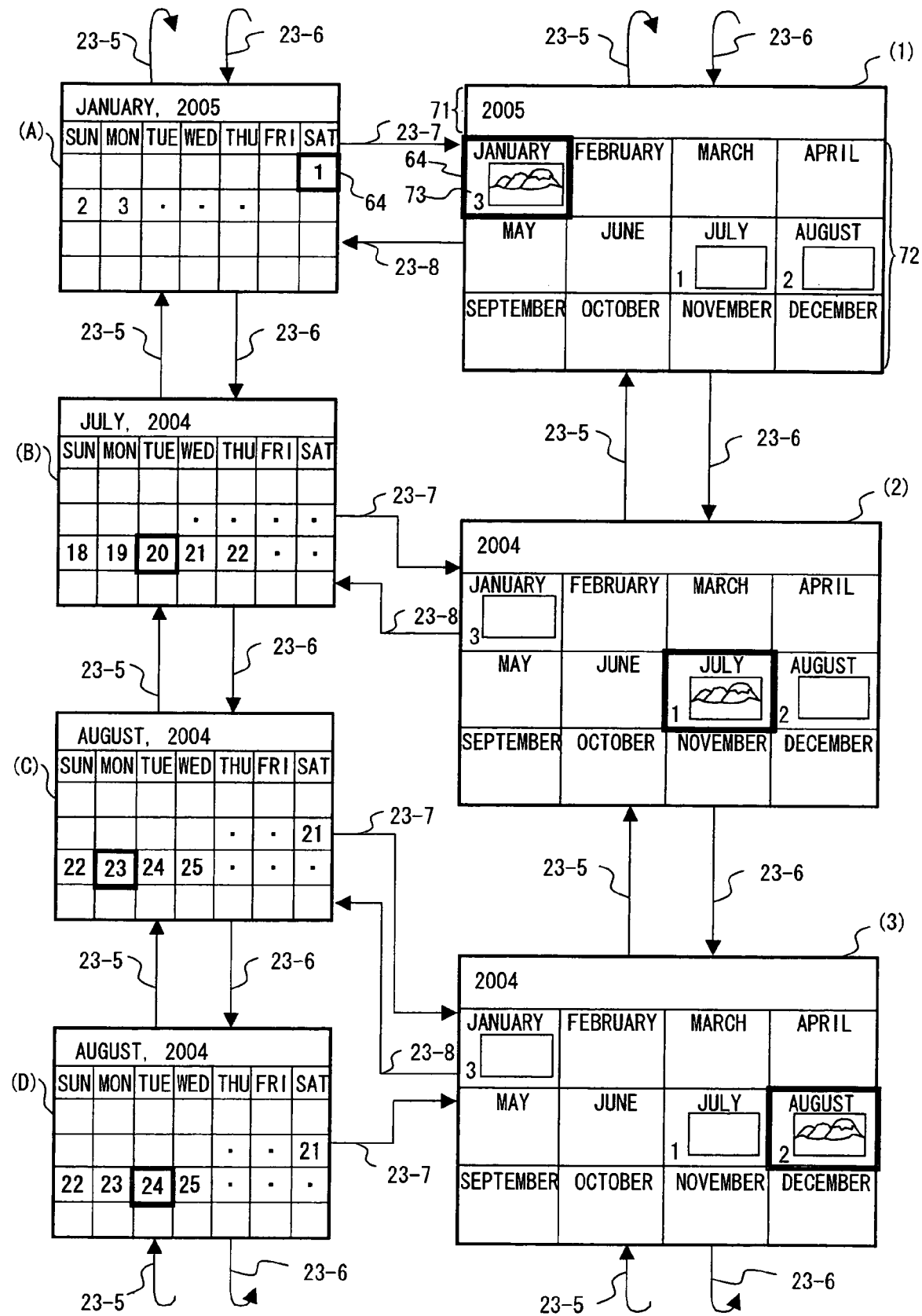
FIG. 11 shows the third method of displaying stored images.

FIG. 11 is described below. In FIG. 11, (A)-(D) and (1)-(3) indicate the displayed screen of the display unit 19. Of these, (A)-(D) are the same as shown in FIG. 7.

In FIG. 11, (1)-(3) shows month calendars. This month calendar is described below with reference to (1). On the top of this screen, a year field 71 indicating a Christian year. Under it, month fields 72 indicating each month from January until December are arrayed to indicate the consecutive time of one year.

Although each month field 72 is enclosed by a thin frame, one of them (a field for "January" in (1)) is enclosed by the cursor frame 64 as on the day calendar. Thus, a user can be visibly notified of an area enclosed by the cursor frame 64. As known in the vicinity of the location of the cursor frame 64 in (1) shown in FIG. 11, the area of the month field 72 for "January" enclosed by the cursor frame 64 contains a number display 73 indicating the number of stored images with the shooting date, the stored images with the shooting date are superimposed and displayed as thumbnail on the month field and number display 73.

Such a thumbnail is also superimposed and displayed on the month field 72 not enclosed by the cursor frame 64.

The shape and color of the cursor frame 64 can be different from those of the day and month calendars.

The transition of a displayed screen according to the button operation shown in FIG. 11 is described below. Since the transition of a displayed screen according to the right button 23-6 or left button 23-5 in the case where one of day calendars (A)-(D) is displayed in FIG. 11 is the same as in the second display method, its description is omitted here.

If a user operates the wide button 23-7 when (A) is displayed on the display unit 19, the CPU 21 switches the display on the display unit and displays a month calendar for "2005" including "January 2005" indicated by the day calendar displayed so far. Furthermore, the cursor frame 64 is displayed on the month field 72 for "January" of the shooting date of this stored image in this month calendar to indicate the month of the stored image. Simultaneously, the stored images are superimposed and displayed as thumbnail on the character "January" indicating the month of the month field 72 and the character "3" of the number display 73 indicating the number of stored images with the shooting date of the month field 72. In this case, (1) is displayed on the display unit 12.

If the user operates the wide button 23-7 when (B) is displayed on the display unit 19, the CPU 21 switches the display on the display unit, and displays a month calendar for "2004" including "July 2004" displayed so far by the day calendar, on the display unit 19. Furthermore, the cursor frame 64 is displayed on the month field 72 for "July" of the shooting date of this stored image in this month calendar to indicate the month of the stored image. Simultaneously, the stored image is superimposed and displayed as thumbnail on the character "July" indicating the month of the month field 72 and the character "1" of the number display 73 indicating the number of stored images with the shooting date of the month field 72. In this case, (2) is displayed on the display unit 19.

Furthermore, if the user operates the wide button 23-7 when (C) or (D) is displayed on the display unit 19, the CPU 21 switched the display on the display unit, and displays a month calendar for "2004" including "August 2004" indicated so far by the day calendar display on the display unit 19. Furthermore, the cursor frame 64 is displayed on the month field 72 for "August" of the shooting date of this stored image in this month calendar to indicate the month of the stored image. Simultaneously, the stored images are superimposed and displayed as thumbnail on the character "August" indicating the month of the month field 72 and the character "2" of the number display 73 indicating the number of stored images with the shooting date of the month field 72. In this case, (3) is displayed on the display unit 19.

As known from FIG. 3, as to the earlier-described transition from (A) to (1) according to the operation of the wide button 23-7, three stored images with the shooting date "January 2005" exist in FIG. 3. Therefore, if in this preferred embodiment a plurality of stored images with a shooting date of the same year/month, of the stored images with a shooting date of the same year/month, one with the minimum frame number is displayed as thumbnail on a month field 72 for "January" in the month calendar as their representative one with the same shooting date. This process is also applied when the screen is transited from (C) or (D) to (3) according to the operation of the wide button 23-7.

Alternatively, of the stored images with the same shooting year/month, one with the maximum frame number can also be displayed on the display unit 19 as their representative one. Alternatively, one with the earliest shooting time can also be displayed as their representative one. Further alternatively, one with the oldest shooting time can also be displayed as their representative one.

However, if the user operates the tele-button 23-8 when (1) is displayed on the display unit 19, the CPU 21 switches the display on the display unit, and displays a day calendar for "January 2005" which is indicated by a month field 72 enclosed by the cursor frame 64 in the month calendar for "2005" so far displayed, on the display unit 19. Furthermore, the cursor frame 64 is displayed on the date field 63 for "1st", being the oldest one of the shooting year/months indicated by the day calendar in the stored images to indicate the shooting date of the stored image. Simultaneously, the stored images are superimposed and displayed as thumbnail on the character "1" of the day calendar field 63. In this case, (A) is displayed on the display unit 19.

If the user operates the tele-button 23-8 when (2) is displayed on the display unit 19, the CPU 21 switches the display on the display unit, and displays a day calendar for "July 2004" which is indicated by the month field 72 enclosed by the cursor frame 64 in the month calendar for "2004" displayed so far, on the display unit 19. Furthermore, the cursor frame 64 is displayed on the date field 63 for "20th", being the oldest one of the shooting year/months indicated by the day calendar in the stored images to indicate the shooting date of the stored image. Simultaneously, the stored images are superimposed and displayed as thumbnail on the character "20" of the day calendar field 63. In this case, (B) is displayed on the display unit 19.

If the user operates the tele-button 23-8 when (3) is displayed on the display unit 19, the CPU 21 switches the display on the display unit, and displays a day calendar for "August 2004" which is indicated by the month field 72 enclosed by the cursor frame 64 in the month calendar for "2004" displayed so far, on the display unit 19. Furthermore, the cursor frame 64 is displayed on the date field 63 for "23rd", being the oldest one of the shooting year/months indicated by the day calendar in the stored images to indicate the shooting date of the stored image. Simultaneously, the stored images are superimposed and displayed as thumbnail on the character "23" of the day calendar field 63. In this case, (D) is not displayed but (C) is displayed on the display unit 19.

A process for display transition from a month calendar to a day calendar according to the operation of the tele-button 23-8 when a plurality of stored images with the same shooting date exist is uniformed the process for display transition from the frame-by-frame display of a stored image to a day calendar according to the operation of the wide button 23-7 in the second display method.

Meanwhile, if the user operates the right button 23-6 when (1) is displayed on the display unit 19, the CPU 21 searches for a year/month immediately after "January 2005" which is indicated by the month field 72 enclosed by the cursor frame 64 in the month calendar for "2005" displayed so far. However, no stored images with a shooting date later than "January 2005" exist in FIG. 3. Therefore, in this case, a stored image with the oldest shooting date is searched for instead, and a month calendar in which the month field 72 of the searched year/month is enclosed by the cursor frame 64, and also the stored images are superimposed and displayed as thumbnail on a character indicating the month of the month field 72 and the character of the number display 73 indicating the number of stored images with the shooting year/month of the month field 72, is displayed. In this case, (2) is displayed on the display unit 19, and a month calendar for "2004" in which the month field 72 for "July 2004", being the oldest shooting year/month of the stored images shown in FIG. 3 is enclosed by the cursor frame 64 and also stored images with the shooting year/month are superimposed and displayed as thumbnail on the character "July" of the month field 72 and the character of the number display 73 indicating the number of stored images with the shooting year/month of the month field 72, is displayed.

Then, if the user further operates the right button 23-6, the CPU 21 searches for a stored image with a shooting year/month immediately after "July 2004" which is indicated by the month field 72 enclosed by the cursor frame 64 in the month calendar for "2004" displayed so far, and displays a month calendar in which the month field 72 of the searched shooting year/month is enclosed by the cursor frame 64 and also stored images with the shooting year/month are superimposed and displayed as thumbnail on the character indicating the month field 72 and the character of the number display 73 indicating the number of stored images with the shooting year/month of the month field 72. In this case, (3) is displayed on the display unit 19, and a month calendar for "2004" in which the month field 72 for "August 2004", being a year/month immediately after "July 2004" of the shooting year/months of the stored images shown in FIG. 3 is enclosed by the cursor frame 64 and also stored images with the shooting year/month are superimposed and displayed as thumbnail on the character "August" of the month field 72 and the character "2" of the number display 73 indicating the number of stored images with the shooting year/month of the month field 72, is displayed.

After this, if similarly the user further continues to operate the right button 23-6, the CPU 21 searches for a stored image with a shooting year/month immediately after one which is indicated by the month field 72 enclosed by the cursor frame 64 on the month calendar displayed so far, of the shooting year/months of stored images on the memory card 17 and displays a month calendar in which the month field 72 of the searched year/month is enclosed by the cursor frame 64 and also stored images with the shooting year/month are superimposed and displayed as thumbnail on a character indicating the month of the month field 72 and the character of the number display 73 indicating the number of stored images with the shooting year/month of the month field 72. Thus, in this case, the screen displayed on the display unit 19 is circulated and switched in order of (1), (2), (3) and so on.

However, if the user operates the left button 23-5 when (1) is displayed on the display unit 19, the CPU 21 searches for a stored image with a shooting year/month immediately before "January 2005" which is indicated by the month field 72 enclosed by the cursor frame 64 in the month calendar for "2005" displayed so far, and displays a month calendar in which the month field 72 of the searched shooting year/month is enclosed by the cursor frame 64 and also stored images with the shooting year/month are superimposed and displayed as thumbnail on the character indicating the month field 72 and the character of the number display 73 indicating the number of stored images with the shooting year/month of the month field 72. In this case, (3) is displayed on the display unit 19, and a month calendar for "2004" in which the month field 72 for "August 2004", being a year/month immediately before "January 2005" of the shooting year/months of the stored images shown in FIG. 3 is enclosed by the cursor frame 64 and also stored images with the shooting year/month are superimposed and displayed as thumbnail on the character "August" of the month field 72 and the character "2" of the number display 73 indicating the number of stored images with the shooting year/month of the month field 72, is displayed.

After this, if similarly the user further continues to operate the left button 23-5, the CPU 21 searches for a stored image with a shooting year/month immediately before one which is indicated by the month field 72 enclosed by the cursor frame 64 on the month calendar displayed so far, of the shooting year/months of stored images on the memory card 17 and displays a month calendar in which the month field 72 of the searched year/month is enclosed by the cursor frame 64 and also stored images with the shooting year/month are superimposed and displayed as thumbnail on a character indicating the month of the month field 72 and the character of the number display 73 indicating the number of stored images with the shooting year/month of the month field 72. Thus, in this case, the screen of the display unit 19 is switched from (3) to (2).

If the user further operates the left button 23-5 when (2) is displayed on the display unit 19, no stored images with a shooting year/month earlier than "July 2004" exists in FIG. 3. Therefore, in this case, a stored image with a year/month closest to the date is searched for instead, and a month calendar in which the month field 72 of the searched year/month is enclosed by the cursor frame 64 and also stored images with the shooting year/month are superimposed and displayed as thumbnail on a character indicating the month of the month field 72 and the character of the number display 73 indicating the number of stored images with the shooting year/month of the month field 72 is displayed. Thus, in this case, (1) is displayed on the display unit 19. If after this, the user further continues to operate the left button 23-5, the screen of the display unit 19 is switched in order of (3), (2), (1) and so on.

As known from FIG. 3, three stored images with a shooting year/month "January 2005" and two with a shooting year/month "August 2004" exist in FIG. 3. In this preferred embodiment, if a plurality of stored images with the same shooting year/month exist, of the stored images with the same shooting year/month, one with the minimum frame number is displayed as thumbnail on the specific month field 72 of the month calendar as their representative one with the same shooting year/month.

Alternatively, of the stored images with the same shooting year/month, a stored image with the maximum frame number can also be displayed on the display unit 19 as their representative stored image. Alternatively, a stored image with the earliest shooting time can also be displayed on the display unit 19 as their representative stored image. Further alternatively, a stored image with the latest shooting time can also be displayed on the display unit 19 as their representative stored image.

Figure 12:
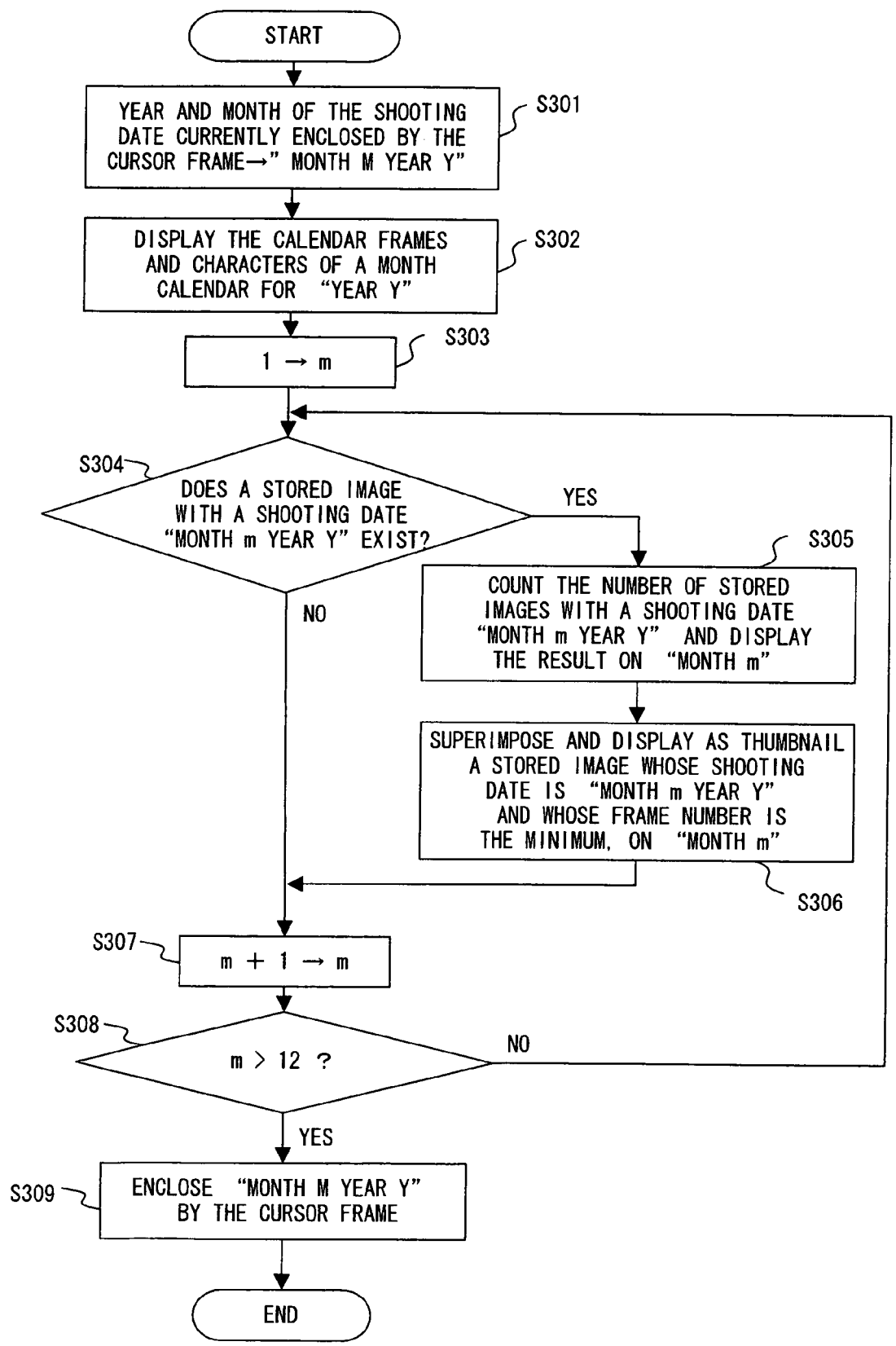
FIG. 12 is a flowchart showing the sixth example of the display image switching process.

Next, FIG. 12 is described below. FIG. 12 is a flowchart showing the sixth example of the display image switching process. The CPU 21 performs this process if the wide button 23-7 is operated when a day calendar is displayed on the display unit 19 to switch the display of a calendar on the display unit 19 according to the operation of the wide button 23-7, described with reference to FIG. 11.

Firstly, in S301, the year/month of the date field 63 enclosed by the cursor frame 64 in the day calendar currently displayed on the display unit 19 (that is, the year/month display 61 of the day calendar) is obtained and is divided into a year and a month, which are assigned to variables Y and M, respectively.

In S302, a month calendar, as shown in FIG. 11 as (1)-(3), for a year indicated by variable Y, that is, a year Y (whose year field 71 indicates a year Y and in which month fields 72 from January until December are arrayed) is generated and displayed on the display unit 19.

In S303, a value "1" is assigned to variable m.

In S304, the memory card 17 is referenced, and it is determined whether a stored image with a shooting year/month "month m year Y" indicated by variables Y and m exists. If it is determined that such a stored image exists (the determination result is yes), the process proceeds to S305. If it is not determined that such a stored image exists (the determination result is no), the process proceeds to S307.

In S305, the number of stored images with a shooting year/month "month m year Y" is counted, and the count result is displayed on the month field 72 of "month m" in the month calendar currently displayed on the display unit 19 as its number display 73.

In S306, of the stored images with a shooting year/month "month m year Y", one with the minimum frame number is superimposed and displayed as thumbnail on the month field of the shooting month (month m) in the month calendar currently displayed on the display unit 19.

In S307, the value of variable m is incremented (a result obtained by adding "1" to the value of variable m is assigned to variable m again).

In S308, it is determined whether a month m indicated by the current value "month m" is later than December, being the last month of a year. If it is determined that "month m" is later than December (the determination result is yes), the process proceeds to S309. If it is not determined that "month m" is later than December (the determination result is no), the process returns to S304 and the above-described process is repeated. By the repetition of this process, stored images are displayed as thumbnail on each month field 72 of the month calendar.

In S309, the location of month field 72 of "month m year Y" in the month calendar currently displayed on the display unit 19 and is enclosed by the cursor frame 64. Then, the process shown in FIG. 12 is terminated.

If the CPU 21 performs the above-described control process, the display on the display unit 19 is switched from the day calendar to a month calendar according to the operation of the wide button 23-7.

Figure 13:
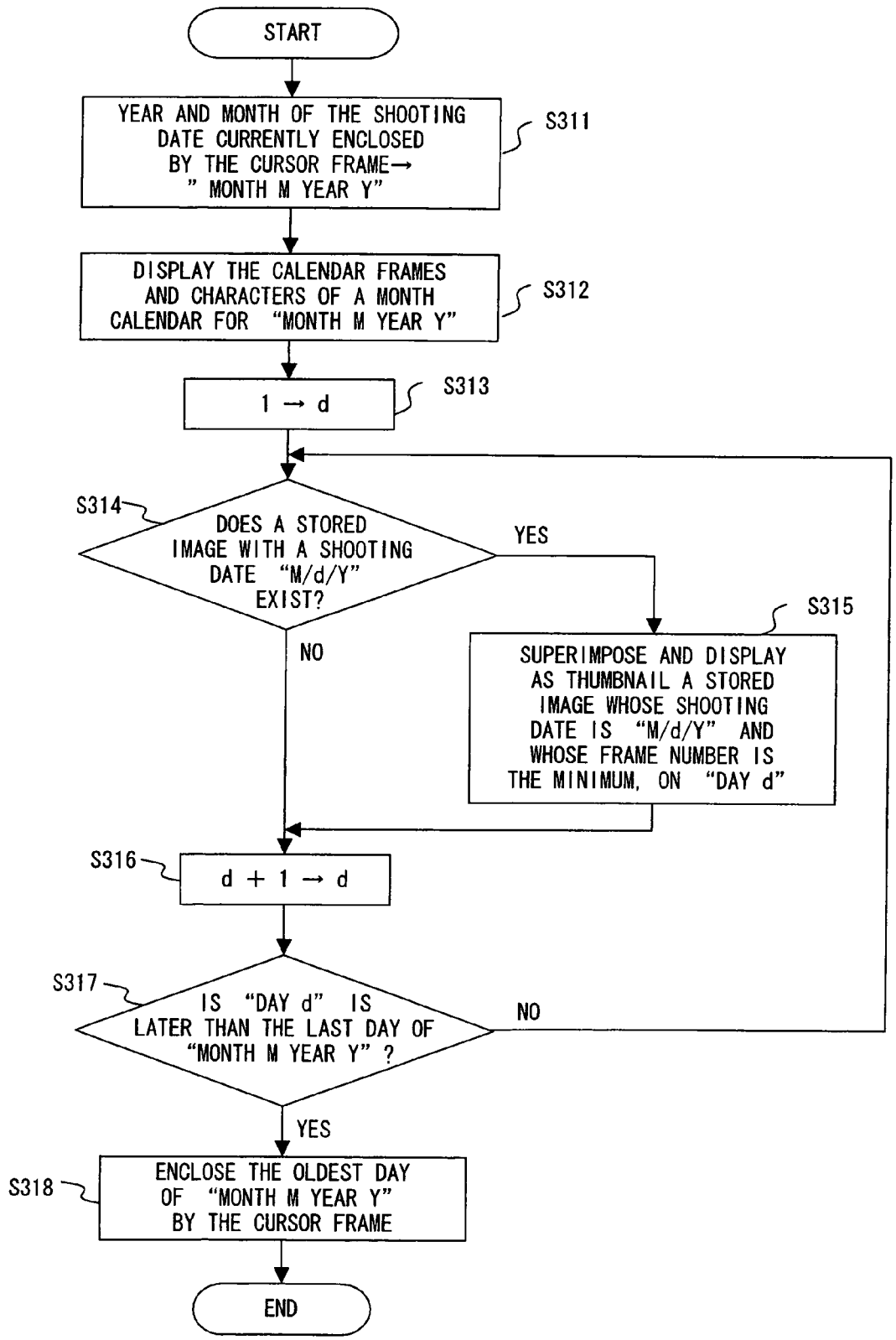
FIG. 13 is a flowchart showing the seventh example of the display image switching process.

Next, FIG. 13 is described. FIG. 13 is a flowchart showing the seventh example of the display image switching process. The CPU 21 performs this process if the tele-button 23-8 is operated when a month calendar is displayed on the display unit 19 to switch calendar displayed on the display unit 19 according to the operation of the tele-button 23-8, described with reference to FIG. 11.

Firstly, in S311, the year/month of the month field 72 enclosed by the cursor frame 64 in a month calendar currently displayed on the display unit 19 is obtained and is divided into a year and a month, which are assigned to variables Y and M, respectively.

In S312, a day calendar, as shown in FIG. 11 as (A)-(D), for a year/month indicated by variables Y and M, that is, "month M year Y" (whose year/month display 61 indicates "month M year Y" and in which day fields 63 from the 1st day until the last day of "month M year Y" are arrayed) is generated and displayed on the display unit 19.

In S313, a value "1" is assigned to variable d.

In S304, the memory card 17 is referenced, and it is determined whether a stored image with a shooting date "M/d/Y" indicated by variables Y, M and d exists. Only if it is determined that such a stored image exists (the determination result is yes), in S315, of the stored images with a shooting date "M/d/Y", one with the minimum frame number is superimposed and displayed as thumbnail on the date field 63 of the shooting date ("day d") in the day calendar currently displayed on the display unit 19.

In S316, the value of variable d is incremented (a result obtained by adding "1" to the value of variable d is assigned to variable m again).

In S317, it is determined whether "day d" indicated by the current value of variable d is later than the last day of "month M year Y". If it is determined that "day d" is later than the last day (the determination result is yes), the process proceeds to S318. If it is not determined that "day d" is later than the last day (the determination result is no), the process returns to S314 and the above-described process is repeated. By the repetition of this process, stored images are displayed as thumbnail on each date field 63 of the day calendar.

In S318, of stored images with a shooting year/month "month M year Y", one with the oldest shooting date is obtained, the location of the date field 63 of the shooting date in the day calendar currently displayed on the display unit 19 and the date field 63 is enclosed by the cursor 64 in the day calendar. Then, the process shown in FIG. 13 is terminated.

If the CPU 21 performs the above-described control process, display is switched from the month calendar to a day calendar according to the operation of the tele-button 23-8.

Next, FIG. 14 is described. FIG. 14 is a flowchart showing the eighth example of the display image switching process. The CPU 21 performs this process if the right button 23-6 is operated when a month calendar is displayed on the display unit 19 to switch a month calendar displayed on the display unit 19 according to the operation of the right button 23-6, described with reference to FIG. 11.

Firstly, in S321, the year/month of the month field 72 enclosed by the cursor frame 64 in a month calendar currently displayed on the display unit 19 is obtained and is divided into a year and a month, which are assigned to variables $Y_1$ and $M_1$, respectively.

In S322, the memory card 17 is referenced, and it is determined whether a stored image with a shooting year/month later than "month $M_1$ year $Y_1$" indicated by variables $Y_1$ and $M_1$ exists. If it is determined that such a stored image exists (the determination result is yes), in S323, the year/month of a shooting date, which is later than "month $M_1$ year $Y_1$" and is the closest to the year/month is obtained and divided into a year and a month, which are assigned to variables $Y_2$ and $M_2$, respectively. Then, the process proceeds to S325. If in S322 it is not determined that such a stored image (the determination result is no), in S324, the year/month of the oldest shooting date of the stored images is obtained and divided into a year and a month, which are assigned to variables $Y_2$ and $M_2$, respectively.

In S325, it is determined whether the value of variable $Y_1$ is equal to that of variable $Y_2$. If it is determined that both are equal (the determination result is yes), it is regarded that the cursor frame 64 is moved on the month calendar currently displayed on the display unit 19 and the process proceeds to S326. If it is not determined that both are equal (the determination result is no), the process proceeds to S327.

In S326, the location of the moth field 72 of "month $M_2$ year $Y_2$" in a month calendar currently displayed on the display unit 19, and the cursor frame 64 currently enclosing the month field 72 of "month $M_1$" in the month calendar is directly moved to the month field 72 of "month $M_2$". Then, the process shown in FIG. 14 is terminated. Since by this process in S326, the cursor frame 64 is immediately moved from the month field 72 of "month $M_1$" to that of "month $M_2$" by only one operation of the right button 23-6, the speed of image retrieval can be improved so much.

The processes in S327 through S334 are performed when the cursor frame 64 is moved out of the month calendar currently displayed on the display unit 19. In this case, after the currently displayed month calendar is modified to later one, the cursor frame 64 is moved to a specific movement destination.

In S327, a month calendar, as shown in FIG. 11 as (1)-(3), for "year $Y_2$" indicated by variables $Y_2$ (whose year display 71 indicates "year $Y_2$" and in which month fields 72 from January until December of "year $Y_2$" are arrayed) is generated and displayed on the display unit 19.

In S328, a value "1" is assigned to variable m.

In S329, the memory card 17 is referenced, and it is determined whether a stored image with a shooting year/month "month m year $Y_2$" indicated by variables $Y_2$ and m exists. If it is determined that such a stored image exists (the determination result is yes), the process proceeds to S330. If it is not determined that such a stored image exists (the determination result is no), the process proceeds to S332.

In S330, the number of stored images with a shooting year/month "month m year $Y_2$" is counted, and the count result is displayed on the month field 72 of "month m" in the month calendar currently displayed on the display unit 19 as its number display 73.

In S331, of the stored images with a shooting year/month "month m year Y", one with the minimum frame number is superimposed and displayed as thumbnail on the month field of the shooting month ("month m") in the month calendar currently displayed on the display unit 19.

In S332, the value of variable m is incremented (a result obtained by adding "1" to the value of variable m is assigned to variable m again).

In S333, it is determined whether "month m" indicated by the current value of variable m is later than December, being the last month of a year. If it is determined that "month m" is later than December (the determination result is yes), the process proceeds to S334. If it is not determined that "month m" is later than December (the determination result is no), the process returns to S329 and the above-described process is repeated. By the repetition of this process, stored images are displayed as thumbnail on each month field 72 of the month calendar.

In S334, the location of month field 72 of "month $M_2$ year $Y_2$" in the month calendar currently displayed on the display unit 19 is recognized and is enclosed by the cursor frame 64. Then, the process shown in FIG. 14 is terminated.

If the CPU 21 performs the above-described control process, the display switching of the month calendar and the movement of the cursor frame 64 are realized according to the operation of the right button 23-6.

The control process of the CPU 21 for realizing the display switching of the month calendar and the movement of the cursor frame 64 according to the operation of the left button 23-5, described with reference to FIG. 11 is also basically the same as shown in FIG. 14. In this case, in S322, it is determined whether a stored image with a shooting year/month earlier than "month $M_1$ year $Y_1$" indicated by variables $Y_1$ and $M_1$ exists. Then, in S323, a shooting year/month which is earlier than "month $M_1$ year $Y_1$" and also is the closest to the year/month and is divided into a year and a month, which are assigned to variables $Y_2$ and $M_2$, respectively. Furthermore, in S324, of the stored images, one with the newest shooting date is obtained and is divided into a year and a month, which are assigned to variables $Y_2$ and $M_2$ respectively. In this case, in S327 through S334, after the month calendar currently displayed on the display unit 19 is modified to earlier one, the cursor frame 64 is moved to a specific movement destination.

Besides, the present invention is not limited to the above-described preferred embodiments and can be variably improved and modified as long as the subject matter of the present invention is not deviated.

What is claimed is:

1. An image display device for displaying a calendar having areas each corresponding to given time intervals, comprising:
 a storage unit for storing at least one sensed image and shooting time information corresponding to the at least one sensed image;
 a calendar display unit for displaying the calendar, the calendar having a plurality of display areas each corresponding to a time interval representing at least one of days in a monthly calendar or months in an annual calendar;
 a thumbnail display unit for displaying a thumbnail in at least one display area of the plurality of display areas of the calendar, the thumbnail corresponding to the at least one sensed image stored in the storage unit as a representative image and displayed based on the shooting time information corresponding to the at least one sensed image;
 an indication unit for providing a visible identifier on the displayed calendar for distinguishing the at least one display area of the plurality of display areas from a remaining display area of the plurality of display areas;
 wherein, upon operation of a change instruction member, an indication control unit controls the indication unit so that the visible identifier only moves to a remaining one of the display areas of the plurality of display areas when the remaining one of the display areas of the plurality of display areas has a thumbnail different from the thumbnail displayed in the at least one display area of said plurality of display areas and when a shooting time information of said different thumbnail has a shooting time temporally closer to the shooting time information of the thumbnail displayed in the at least one display area of the plurality of display areas than any other of a remaining display area of the remaining display area of the plurality of display areas.

2. The image display device according to claim 1, wherein the calendar display unit includes a display form changing unit capable of changing a display form to one of a monthly calendar or an annual calendar
 wherein, although the display form is changed to one of the monthly calendar or the annual calendar, when the display form change instruction unit is operated, the thumbnail identified by the visible indicator prior to the display form change is not changed.

3. The image display device according to claim 2, wherein when a monthly calendar displaying thumbnails on a plurality of display areas corresponding to shooting time information of sensed images of said thumbnails is changed to the annual calendar, the calendar display unit superimposes and displays a number in the display area of the annual calendar which corresponds to the monthly calendar, which number represents a total of the thumbnails whose shooting time information is included in the display area of the annual calendar corresponding to monthly calendar.

4. The image display device according to claim 1, wherein the shooting time information of the at least one of the display areas of the plurality of display areas and the one of the remaining display areas of the plurality of display areas each indicates a shooting date; and
 the shooting date of the one of the remaining display areas of the plurality of display areas temporally closer to the shooting date of the at least one of the display areas of the plurality of display areas is one of a shooting date later or earlier than the shooting date of the at least one of the display areas of the plurality of display areas.

5. An image display device for displaying a calendar, comprising:
 a storage unit for storing at least one sensed image and shooting time information corresponding to the at least one sensed image;
 a calendar display unit for displaying the calendar, the calendar having a plurality of display areas each display area representing either days in a monthly calendar or months in an annual calendar;
 a thumbnail display unit for displaying a thumbnail image in one of the display areas of the plurality of display areas of the calendar, the thumbnail image corresponding to the at least one sensed image stored in the storage unit and displayed based on the shooting time information corresponding to the at least one sensed image, whereby the shooting time information corresponding to the at least one sensed image lies within a time interval of said one display area; and
 an indication unit for providing a visible identifier on the one display area of the plurality of display areas for distinguishing the one display area from all other display areas of the calendar;
 wherein, the indication unit, responsive to a single operation of a change instruction member, moves the visible identifier from the one display area to another one of the remaining display areas of the plurality of display areas which is closest to the one display area and has a thumbnail image, and wherein the indication unit does not move the visible identifier to a display area closer to the one display area than said another one of the remaining display areas which does not have a thumbnail image.

6. The image display device according to claim 5, wherein the calendar display unit includes a display form changing unit capable of changing a display form to one of the monthly calendar or the annual calendar,
 wherein, although the display form is changed to one of the monthly calendar or the annual calendar, when the display form changing unit is operated, the thumbnail identified by the visible indicator prior to the display form change is not changed.

7. The image display device according to claim 6, wherein when the monthly calendar displaying thumbnails at a plurality of display areas corresponding to shooting time information of sensed images of said thumbnails is changed to the annual calendar, the calendar display unit superimposes and displays a number in the display area of the annual calendar which corresponds to the monthly calendar, which number represents a total of the thumbnails whose shooting time information is included in the display area of the annual calendar corresponding to the monthly calendar.

8. The image display device according to claim 5, wherein the shooting time information of the one display area of the plurality of display areas and the one of the remaining display areas of the plurality of display areas each indicates a shooting date; and
 the shooting date of the one of the remaining display areas of the plurality of display areas temporally closest to the shooting date of the one display area of the plurality of display areas is one of a shooting date later or earlier than the shooting date of the one display area of the plurality of display areas.

* * * * *